US 7,707,255 B2

(12) United States Patent
Satterfield et al.

(10) Patent No.: US 7,707,255 B2
(45) Date of Patent: Apr. 27, 2010

(54) AUTOMATIC GROUPING OF ELECTRONIC MAIL

(75) Inventors: Jesse Clay Satterfield, Seattle, WA (US); Jensen M. Harris, Kirkland, WA (US); Martijn E. Van Tilburg, Seattle, WA (US); William A. Avery, Redmond, WA (US); Bruce D. Wiedemann, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 1015 days.

(21) Appl. No.: 10/848,774

(22) Filed: May 19, 2004

(65) Prior Publication Data

US 2005/0004989 A1 Jan. 6, 2005

Related U.S. Application Data

(60) Provisional application No. 60/484,437, filed on Jul. 1, 2003.

(51) Int. Cl.
*G06F 15/16* (2006.01)
(52) U.S. Cl. ........................... 709/206; 709/207
(58) Field of Classification Search ................... None
See application file for complete search history.

(56) References Cited

U.S. PATENT DOCUMENTS

| | | | | |
|---|---|---|---|---|
| 5,155,806 A | 10/1992 | Hoeber et al. | ............... | 715/711 |
| 5,377,354 A * | 12/1994 | Scannell et al. | ............ | 718/103 |
| 5,500,936 A | 3/1996 | Allen et al. | ................. | 395/156 |
| 5,519,606 A | 5/1996 | Frid-Nielsen et al. | .......... | 705/9 |
| 5,559,944 A | 9/1996 | Ono | ........................... | 715/841 |
| 5,570,109 A | 10/1996 | Jenson | ....................... | 715/823 |
| 5,596,694 A | 1/1997 | Capps | ........................ | 345/473 |
| 5,625,783 A | 4/1997 | Ezekiel et al. | .............. | 395/352 |
| 5,634,100 A | 5/1997 | Capps | ........................... | 705/9 |
| 5,634,128 A | 5/1997 | Messina | ..................... | 710/200 |
| 5,638,504 A | 6/1997 | Scott et al. | .................. | 715/202 |

(Continued)

FOREIGN PATENT DOCUMENTS

EP     0 910 007     4/1999

(Continued)

OTHER PUBLICATIONS

U.S. Final Office Action dated Dec. 21, 2007 cited in U.S. Appl. No. 10/851,506.

(Continued)

*Primary Examiner*—Hassan Phillips
(74) *Attorney, Agent, or Firm*—Merchant & Gould

(57) ABSTRACT

Automatic sorting and grouping of electronic mail items in an electronic mail system is provided. An automatic mail grouping property may be selected for electronic mail received, sent or stored in a variety of storage folders. For a given mail location (e.g., received mail, sent mail, or a given mail storage folder), a selected automatic grouping property causes mail to be displayed to a user in one or more categories that make location of specific mail items easier and more efficient. Visible dividers with optional headings may be provided between mail categories to quickly draw a user's attention to a given mail category and to separate large numbers of mail into logical groupings that make location of specific mail items more manageable.

26 Claims, 15 Drawing Sheets

U.S. PATENT DOCUMENTS

| | | | |
|---|---|---|---|
| 5,644,737 A | 7/1997 | Tuniman et al. | 715/810 |
| 5,664,127 A | 9/1997 | Anderson et al. | 715/776 |
| 5,664,208 A | 9/1997 | Pavley et al. | 715/209 |
| 5,721,847 A | 2/1998 | Johnson | 395/333 |
| 5,734,915 A | 3/1998 | Roewer | 395/773 |
| 5,760,768 A | 6/1998 | Gram | 345/333 |
| 5,760,773 A | 6/1998 | Berman et al. | 715/808 |
| 5,761,646 A | 6/1998 | Frid-Nielsen et al. | 705/9 |
| 5,778,402 A | 7/1998 | Gipson | 707/530 |
| 5,778,404 A | 7/1998 | Capps et al. | 715/531 |
| 5,805,167 A | 9/1998 | Van Cruyningen | 715/808 |
| 5,821,936 A | 10/1998 | Shaffer et al. | 715/810 |
| 5,828,376 A | 10/1998 | Solimene et al. | 715/821 |
| 5,838,321 A | 11/1998 | Wolf | 345/343 |
| 5,842,009 A | 11/1998 | Borovoy et al. | 707/1 |
| 5,844,558 A | 12/1998 | Kumar et al. | 345/339 |
| 5,844,572 A | 12/1998 | Schott | 345/440 |
| 5,855,006 A | 12/1998 | Huemoeller et al. | 705/9 |
| 5,885,006 A | 3/1999 | Sheedy | 384/192 |
| 5,893,125 A | 4/1999 | Shostak | 715/206 |
| 5,898,436 A | 4/1999 | Stewart et al. | 345/354 |
| 5,899,979 A | 5/1999 | Miller et al. | 705/9 |
| 5,905,863 A | 5/1999 | Knowles et al. | 709/206 |
| 5,926,806 A | 7/1999 | Marshall et al. | 707/3 |
| 5,936,625 A | 8/1999 | Kahl et al. | 715/775 |
| 5,940,078 A | 8/1999 | Nagarajayya et al. | 345/346 |
| 5,940,847 A | 8/1999 | Fein et al. | 707/540 |
| 5,943,051 A | 8/1999 | Onda et al. | 715/786 |
| 5,960,406 A | 9/1999 | Rasansky et al. | 705/9 |
| 5,970,466 A | 10/1999 | Detjen et al. | 705/8 |
| 5,999,938 A | 12/1999 | Bliss et al. | 707/102 |
| 6,008,806 A | 12/1999 | Nakajima et al. | 345/335 |
| 6,012,075 A | 1/2000 | Fein et al. | 707/540 |
| 6,018,343 A | 1/2000 | Wang et al. | 345/356 |
| 6,034,683 A | 3/2000 | Mansour et al. | 715/764 |
| 6,067,087 A | 5/2000 | Krauss et al. | 715/762 |
| 6,072,492 A | 6/2000 | Schagen et al. | 715/733 |
| 6,085,206 A | 7/2000 | Domini et al. | 707/533 |
| 6,101,480 A | 8/2000 | Conmy et al. | 705/9 |
| 6,133,915 A | 10/2000 | Arcuri et al. | 715/779 |
| 6,175,363 B1 | 1/2001 | Williams et al. | 345/334 |
| 6,188,403 B1 | 2/2001 | Sacerdoti et al. | 715/764 |
| 6,192,381 B1 | 2/2001 | Stiegemeier et al. | 707/505 |
| 6,211,879 B1 | 4/2001 | Soohoo | 345/357 |
| 6,216,122 B1 | 4/2001 | Elson | 707/3 |
| 6,219,670 B1 | 4/2001 | Mocek et al. | 707/102 |
| 6,222,540 B1 | 4/2001 | Sacerdoti | 345/440 |
| 6,232,971 B1 | 5/2001 | Haynes | 345/340 |
| 6,236,396 B1 | 5/2001 | Jenson et al. | 715/764 |
| 6,256,628 B1 | 7/2001 | Dobson et al. | 707/6 |
| 6,278,450 B1 | 8/2001 | Arcuri et al. | 345/334 |
| 6,289,317 B1 | 9/2001 | Peterson | 705/7 |
| 6,307,544 B1 | 10/2001 | Harding | 715/709 |
| 6,323,883 B1 | 11/2001 | Minoura et al. | 715/784 |
| 6,353,451 B1 | 3/2002 | Teibel et al. | 345/803 |
| 6,359,634 B1 | 3/2002 | Cragun et al. | 715/777 |
| 6,373,507 B1 | 4/2002 | Camara et al. | 345/825 |
| 6,384,849 B1 | 5/2002 | Morcos et al. | 715/810 |
| 6,405,216 B1 | 6/2002 | Minnaert et al. | 707/104.1 |
| 6,424,829 B1 * | 7/2002 | Kraft | 455/412.1 |
| 6,429,882 B1 | 8/2002 | Abdelnur et al. | 345/763 |
| 6,433,801 B1 | 8/2002 | Moon et al. | 345/840 |
| 6,456,304 B1 | 9/2002 | Angiulo et al. | 345/779 |
| 6,459,441 B1 | 10/2002 | Perroux et al. | 345/837 |
| 6,466,236 B1 | 10/2002 | Pivowar et al. | 715/835 |
| 6,469,722 B1 | 10/2002 | Kineo et al. | 345/837 |
| 6,480,865 B1 | 11/2002 | Lee et al. | 715/523 |
| 6,493,006 B1 | 12/2002 | Gourdol et al. | 715/825 |
| 6,493,731 B1 | 12/2002 | Jones et al. | 707/501.1 |
| 6,546,417 B1 * | 4/2003 | Baker | 709/206 |
| 6,570,596 B2 | 5/2003 | Frederiksen | 715/808 |
| 6,578,192 B1 | 6/2003 | Boehme et al. | 717/115 |
| 6,583,798 B1 | 6/2003 | Hoek et al. | 345/822 |
| 6,618,732 B1 | 9/2003 | White et al. | 707/103 |
| 6,621,504 B1 | 9/2003 | Nadas et al. | 715/723 |
| 6,621,508 B1 | 9/2003 | Shiraishi et al. | 715/810 |
| 6,635,089 B1 | 10/2003 | Burkett et al. | 715/513 |
| 6,664,983 B2 | 12/2003 | Ludolph | 715/775 |
| 6,680,749 B1 | 1/2004 | Anderson et al. | 348/231.99 |
| 6,686,938 B1 | 2/2004 | Jobs et al. | 345/835 |
| 6,691,281 B1 | 2/2004 | Sorge et al. | 715/503 |
| 6,708,205 B2 * | 3/2004 | Sheldon et al. | 709/206 |
| 6,727,919 B1 | 4/2004 | Reder et al. | 715/810 |
| 6,732,330 B1 | 5/2004 | Claussen et al. | 715/513 |
| 6,734,880 B2 | 5/2004 | Chang et al. | 715/738 |
| 6,750,890 B1 | 6/2004 | Sugimoto | 715/838 |
| 6,785,868 B1 | 8/2004 | Raff | 715/530 |
| 6,825,859 B1 | 11/2004 | Severenuk et al. | 345/764 |
| 6,826,729 B1 | 11/2004 | Giesen et al. | 715/837 |
| 6,850,255 B2 | 2/2005 | Muschetto | 715/788 |
| 6,871,195 B2 | 3/2005 | Ryan et al. | 706/46 |
| 6,882,354 B1 | 4/2005 | Nielsen | 715/784 |
| 6,904,449 B1 | 6/2005 | Quinones | 709/203 |
| 6,906,717 B2 | 6/2005 | Couckuyt et al. | 345/440 |
| 6,915,492 B2 | 7/2005 | Kurtenbach et al. | 715/810 |
| 6,924,797 B1 | 8/2005 | MacPhail | 345/326 |
| 6,964,025 B2 | 11/2005 | Angiulo | 715/838 |
| 6,983,889 B2 | 1/2006 | Alles | 236/49.1 |
| 6,988,241 B1 | 1/2006 | Guttman et al. | 715/503 |
| 6,990,637 B2 | 1/2006 | Anthony et al. | 715/851 |
| 7,032,210 B2 | 4/2006 | Alloing et al. | 717/106 |
| 7,039,596 B1 | 5/2006 | Lu | 705/8 |
| 7,046,848 B1 | 5/2006 | Olcott | 382/176 |
| 7,107,544 B1 | 9/2006 | Luke | 715/752 |
| 7,110,936 B2 | 9/2006 | Hiew et al. | 703/22 |
| 7,152,207 B1 | 12/2006 | Underwood et al. | 715/526 |
| 7,188,073 B1 | 3/2007 | Tam et al. | 705/9 |
| 7,212,208 B2 | 5/2007 | Khozai | 345/440 |
| 7,216,301 B2 | 5/2007 | Moehrle | 715/811 |
| 7,249,325 B1 | 7/2007 | Donaldson | 715/777 |
| 7,325,204 B2 | 1/2008 | Rogers | 715/792 |
| 7,328,409 B2 | 2/2008 | Awada et al. | 715/765 |
| 7,337,185 B2 | 2/2008 | Ellis et al. | 707/102 |
| 7,346,705 B2 | 3/2008 | Hullot et al. | 709/238 |
| 7,346,769 B2 | 3/2008 | Forlenza et al. | 713/151 |
| 7,360,174 B2 | 4/2008 | Grossman et al. | 715/854 |
| 7,392,249 B1 | 6/2008 | Harris et al. | |
| 7,505,954 B2 | 3/2009 | Heidloff et al. | 707/1 |
| 7,530,029 B2 | 5/2009 | Satterfield et al. | 715/779 |
| 7,567,964 B2 | 7/2009 | Brice et al. | 707/9 |
| 2002/0007380 A1 | 1/2002 | Bauchot et al. | 707/530 |
| 2002/0037754 A1 | 3/2002 | Hama et al. | 455/566 |
| 2002/0052721 A1 | 5/2002 | Ruff et al. | 703/1 |
| 2002/0070977 A1 | 6/2002 | Morcos et al. | 345/810 |
| 2002/0075330 A1 | 6/2002 | Rosenweig et al. | 345/854 |
| 2002/0078143 A1 | 6/2002 | DeBoor et al. | |
| 2002/0091739 A1 | 7/2002 | Ferlitsch et al. | 707/526 |
| 2002/0122071 A1 | 9/2002 | Camara et al. | |
| 2002/0133557 A1 * | 9/2002 | Winarski | 709/207 |
| 2002/0135621 A1 | 9/2002 | Angiulo et al. | 345/838 |
| 2002/0140731 A1 | 10/2002 | Subramaniam et al. | 345/762 |
| 2002/0140740 A1 | 10/2002 | Chen | |
| 2002/0149623 A1 | 10/2002 | West et al. | 345/765 |
| 2002/0149629 A1 | 10/2002 | Craycroft et al. | 345/861 |
| 2002/0154178 A1 | 10/2002 | Barnett et al. | 715/853 |
| 2002/0163538 A1 * | 11/2002 | Shteyn | 345/752 |
| 2002/0175955 A1 | 11/2002 | Gourdol et al. | 345/821 |
| 2002/0196293 A1 | 12/2002 | Suppan et al. | 345/853 |
| 2003/0009455 A1 | 1/2003 | Carlson et al. | 707/6 |
| 2003/0011638 A1 | 1/2003 | Chung | 345/808 |
| 2003/0011639 A1 | 1/2003 | Webb | 715/808 |
| 2003/0014490 A1 | 1/2003 | Bates et al. | 709/206 |
| 2003/0022700 A1 | 1/2003 | Wang | 455/566 |
| 2003/0035917 A1 | 2/2003 | Hyman | 428/67 |

| | | | |
|---|---|---|---|
| 2003/0038832 A1 | 2/2003 | Sobol | |
| 2003/0043211 A1 | 3/2003 | Kremer et al. | |
| 2003/0066025 A1 | 4/2003 | Garner et al. | 715/500 |
| 2003/0070143 A1 | 4/2003 | Maslov | 715/513 |
| 2003/0093490 A1 | 5/2003 | Yamamoto et al. | 709/213 |
| 2003/0097361 A1 | 5/2003 | Huang et al. | 707/10 |
| 2003/0098891 A1 | 5/2003 | Molander | 715/841 |
| 2003/0110191 A1 | 6/2003 | Handsaker et al. | 707/503 |
| 2003/0112278 A1 | 6/2003 | Driskell | 715/788 |
| 2003/0163455 A1 | 8/2003 | Dettinger et al. | 707/3 |
| 2003/0167310 A1* | 9/2003 | Moody et al. | 709/206 |
| 2003/0169284 A1 | 9/2003 | Dettinger et al. | 715/708 |
| 2003/0195937 A1* | 10/2003 | Kircher et al. | 709/207 |
| 2003/0206646 A1 | 11/2003 | Brackett | |
| 2003/0218611 A1 | 11/2003 | Ben-Tovim et al. | 345/440 |
| 2003/0226106 A1 | 12/2003 | McKellar et al. | 715/513 |
| 2003/0227487 A1 | 12/2003 | Hugh | 715/777 |
| 2003/0233419 A1* | 12/2003 | Beringer | 709/206 |
| 2004/0003351 A1 | 1/2004 | Sommerer et al. | 715/251 |
| 2004/0012633 A1 | 1/2004 | Helt | |
| 2004/0056894 A1 | 3/2004 | Zaika et al. | 345/762 |
| 2004/0090315 A1 | 5/2004 | Mackjust et al. | 340/426.13 |
| 2004/0100504 A1 | 5/2004 | Sommer | 345/810 |
| 2004/0100505 A1 | 5/2004 | Cazier | 345/811 |
| 2004/0107197 A1 | 6/2004 | Shen et al. | 707/9 |
| 2004/0109025 A1 | 6/2004 | Hullot et al. | 715/764 |
| 2004/0109033 A1 | 6/2004 | Vienneau et al. | 345/863 |
| 2004/0119760 A1 | 6/2004 | Grossman et al. | 715/854 |
| 2004/0128275 A1 | 7/2004 | Moehrle | 707/1 |
| 2004/0133854 A1 | 7/2004 | Black | 715/517 |
| 2004/0142720 A1 | 7/2004 | Smethers | 455/550.1 |
| 2004/0164983 A1 | 8/2004 | Khozai | 345/440 |
| 2004/0168153 A1 | 8/2004 | Marvin | 717/120 |
| 2004/0186775 A1 | 9/2004 | Margiloff et al. | 705/14 |
| 2004/0221234 A1 | 11/2004 | Imai | 715/256 |
| 2004/0230508 A1 | 11/2004 | Minnis et al. | 705/35 |
| 2004/0230906 A1 | 11/2004 | Pik et al. | 715/522 |
| 2004/0239700 A1 | 12/2004 | Baschy | 715/781 |
| 2004/0243938 A1 | 12/2004 | Weise et al. | 715/205 |
| 2004/0268231 A1 | 12/2004 | Tunning | 715/513 |
| 2005/0004990 A1 | 1/2005 | Durazo et al. | 709/206 |
| 2005/0005249 A1 | 1/2005 | Hill et al. | 715/963 |
| 2005/0010871 A1 | 1/2005 | Ruthfield et al. | 715/712 |
| 2005/0021504 A1 | 1/2005 | Atchison | 707/3 |
| 2005/0022116 A1 | 1/2005 | Bowman et al. | 715/513 |
| 2005/0039142 A1 | 2/2005 | Jalon et al. | 715/823 |
| 2005/0044500 A1 | 2/2005 | Orimoto et al. | 715/706 |
| 2005/0057584 A1 | 3/2005 | Gruen et al. | 715/752 |
| 2005/0086135 A1 | 4/2005 | Lu | 705/30 |
| 2005/0117179 A1 | 6/2005 | Ito et al. | 358/1.15 |
| 2005/0138576 A1 | 6/2005 | Baumert et al. | 715/862 |
| 2005/0172262 A1 | 8/2005 | Lalwani | 717/109 |
| 2005/0183008 A1 | 8/2005 | Crider et al. | 715/517 |
| 2005/0216863 A1 | 9/2005 | Schumacher et al. | 715/827 |
| 2005/0223329 A1 | 10/2005 | Schwartz et al. | 715/711 |
| 2005/0256867 A1 | 11/2005 | Walther et al. | 707/5 |
| 2005/0278656 A1 | 12/2005 | Goldthwaite et al. | 715/810 |
| 2005/0289156 A1 | 12/2005 | Maryka et al. | 707/100 |
| 2006/0020962 A1 | 1/2006 | Stark | 725/32 |
| 2006/0036580 A1 | 2/2006 | Stata | 707/3 |
| 2006/0036945 A1 | 2/2006 | Radtke et al. | 715/708 |
| 2006/0036965 A1 | 2/2006 | Harris et al. | 715/777 |
| 2006/0041545 A1 | 2/2006 | Heidloff et al. | 707/4 |
| 2006/0095865 A1 | 5/2006 | Rostom | 715/810 |
| 2006/0101051 A1 | 5/2006 | Carr et al. | 707/102 |
| 2006/0101350 A1 | 5/2006 | Scott | 715/779 |
| 2006/0111931 A1 | 5/2006 | Johnson et al. | 705/1 |
| 2006/0117249 A1 | 6/2006 | Hu et al. | 715/255 |
| 2006/0129937 A1 | 6/2006 | Shafron | 715/733 |
| 2006/0173824 A1 | 8/2006 | Bensky | 707/3 |
| 2006/0218500 A1 | 9/2006 | Sauve et al. | 715/767 |
| 2006/0242557 A1 | 10/2006 | Nortis III | 715/234 |
| 2006/0242575 A1 | 10/2006 | Winser | 715/530 |
| 2006/0294452 A1 | 12/2006 | Matsumoto | 715/236 |
| 2007/0050401 A1 | 3/2007 | Young et al. | 707/102 |
| 2007/0106951 A1 | 5/2007 | McCormack et al. | 715/764 |
| 2007/0143671 A1 | 6/2007 | Paterson et al. | 715/209 |
| 2007/0185826 A1 | 8/2007 | Brice et al. | 707/1 |
| 2007/0240057 A1 | 10/2007 | Satterfield et al. | 715/705 |
| 2007/0260996 A1 | 11/2007 | Jakobson | 715/781 |
| 2007/0279417 A1 | 12/2007 | Garg et al. | 345/440 |
| 2007/0300168 A1 | 12/2007 | Bosma et al. | 715/820 |
| 2008/0034304 A1 | 2/2008 | Feuerbacher et al. | 715/764 |
| 2008/0040682 A1 | 2/2008 | Sorenson et al. | 715/777 |
| 2008/0178110 A1 | 7/2008 | Hill et al. | 715/771 |
| 2009/0007003 A1 | 1/2009 | Dukhon et al. | 715/778 |
| 2009/0083656 A1 | 3/2009 | Dukhon et al. | 715/781 |
| 2009/0217192 A1 | 8/2009 | Dean et al. | 715/777 |
| 2009/0222763 A1 | 9/2009 | Dukhon et al. | 715/808 |

FOREIGN PATENT DOCUMENTS

| | | |
|---|---|---|
| EP | 1 672 518 | 6/2001 |
| EP | 1223503 | 7/2002 |
| EP | 1376337 | 2/2004 |
| EP | 1 835 434 A1 | 9/2007 |
| GB | 2391148 | 1/2004 |
| WO | WO 9904353 A1 * | 1/1999 |
| WO | WO 99/27495 | 6/1999 |
| WO | WO 02/091162 A3 | 11/2002 |
| WO | WO 00/3098500 | 11/2003 |

OTHER PUBLICATIONS

U.S. Final Office Action dated Dec. 28, 2007 cited in U.S. Appl. No. 10/800,056.

U.S. Final Office Action dated Jan. 8, 2008 cited in U.S. Appl. No. 10/955,928.

U.S. Office Action dated Jul. 13, 2007 cited in U.S. Appl. No. 10/800,056.

U.S. Final Office Action dated Dec. 4, 2007 cited in U.S. Appl. No. 10/955,940.

U.S. Office Action dated Sep. 26, 2007, cited in U.S. Appl. No. 11/151,686.

U.S. Office Action dated Oct. 9, 2007, cited in U.S. Appl. No. 10/982,073.

U.S. Appl. No. 11/154,278, filed Jun. 16, 2005 entitled "Cross Version and Cross Product User Interface Compatibility".

U.S. Appl. No. 11/151,686, filed Jun. 13, 2005 entitled "Floating Command Object".

U.S. Appl. No. 11/401,470, filed Apr. 10, 2006 entitled "Command User Interface for Displaying Selectable Functionality Controls in a Database Application".

U.S. Appl. No. 10/607,020, filed Jun. 26, 2003 entitled "Side-by-Side Shared Calendars".

U.S. Appl. No. 10/741,407, filed Dec. 19, 2003 entitled "Methods, Systems, and Computer-Readable Mediums for Providing Persisting and Continuously Updating Search Folders".

U.S. Appl. No. 11/782,059, filed Jul. 24, 2007 entitled "Methods, Systems, and Computer-Readable Mediums for Providing Persisting and Continuously Updating Search Folders".

U.S. Appl. No. 10/955,941, filed Sep. 30, 2004 entitled "An Improved User Interface for Displaying Selectable Software Functionality Controls that are Relevant to a Selected Object".

Gordon Padwick, Using Microsoft Outlook 2000, Que, Sp. Ed., May 1999.

Becker et al., "Virtual Folders: Database Support for Electronic Messages Classification," Pontificia Universidade Catolica do Rio Grande do Sul, Porto Alegre, Brazil, pp. 163-170.

Goldberg et al., "Using Collaborative Filtering to Weave an Information Tapestry," Communication of the ACM, vol. 35, No. 12, pp. 61-70, Dec. 1992.

Liu et al., "Continual Queries for Internet Scale Event-Driven Information Delivery," IEEE Transactions on Knowledge and Data Engineering, vol. 11, Issue 1, pp. 610-628, 1999.

Chen et al., "NiagaraCQ: A Scalable Continuous Query System for Internet Databases," Int. Conf. On Management of Data, Proc. Of the 2000 ACM SIGMOD Int. Conf. On Management of Data, pp. 379-390, 2000.

Marshall School of Business: "Workshop IV—Calendar," http://www.marshall.usc.edu/computing/PDF_Files/Outlook/Workshop4; PDF, Apr. 10, 2000, pp. 1-4.

M. Williams, "Programming Windows NT4: Unleashed," Sams Publishing, Indianapolis, 1996, pp. index & 167-185.

"Microsoft Outlook 2000: Introduction to Calendar," Version Mar. 25, 2002, http://www.uakron.edu/its/learning/training/docs/Calendar032502.pdf, Mar. 25, 2002, pp. 1-52.

Screen Dumps of Microsoft Outlook (1999, pp. 1-3).

"To-do List—effective task management software" [on line], Aug. 3, 2004, http://web.archive.org/web/20040804103245/www.htpshareware.com/todolist/changes.txt and http://web.archive.org/web/20040803075026/www.htpshareware.com/todolist/index.htm>.

"Rainy's Rainlendar" [online], Aug. 12, 2004, http://web.archive.org/web/20040811043048/www.ipi.fi/~rainy/Rainlendard/Manual.html and http://web.archive.org/web/20040812092939/http://www.ipi.fi/~rainy/index.php?pn=probjects&project=rainlendar>.

Microsoft Windows XP Professional, Version 2002, Service pack 2, 3 pgs.

Camarda, Using Microsoft Word 97, copyright 1997, QUE Corporation, pp. 412, 968.

Australian Search Report dated Jan. 16, 2007 cited in Singapore Application 200504474-8.

PCT Search Report dated Feb. 26, 2007 cited in International Application No. PCT/US2006/034993.

European Communicated dated Oct. 20, 2005 cited in EP Application No. 04102463.0-2211 PCT/.

Australian Written Opinion/Search Report cited in Singapore Application No. 200505257-6 mailed Feb. 12, 2007.

U.S. Office Action dated Apr. 12, 2007 cited in U.S. Appl. No. 10/851,506.

U.S. Office Action dated Jun. 4, 2007 cited in U.S. Appl. No. 10/955,940.

U.S. Office Action dated Jul. 26, 2006 cited in U.S. Appl. No. 10/741,407.

U.S. Final Office Action dated Jan. 23, 2007 cited in U.S. Appl. No. 10/741,407.

U.S. Notice of Allowance dated Apr. 10, 2007 cited in U.S. Appl. No. 10/741,407.

U.S. Office Action dated Jan. 4, 2007 cited in U.S. Appl. No. 10/607,020.

U.S. Office Action dated Jun. 14, 2007 cited in U.S. Appl. No. 10/836,154.

U.S. Office Action dated Jun. 21, 2007 cited in U.S. Appl. No. 10/955,928.

U.S. Notice of Allowance dated Jul. 5, 2007 cited in U.S. Appl. No. 10/607,020.

U.S. Office Action dated Jul. 11, 2007 cited in U.S. Appl. No. 10/955,941.

U.S. Office Action dated Jul. 11, 2007 cited in U.S. Appl. No. 10/955,967.

U.S. Office Action dated Jul. 11, 2007 cited in U.S. Appl. No. 10/955,942.

Charles Rich, Candace L. Sidner, "Segmented Interaction History in a Collaborative Interface Agent," 1997 ACM, pp. 23-30.

Andrew Dwelly, "Functions and Dynamic User Interfaces," 1989 ACM, pp. 371-381.

Alias I. Wavefront, "The Hotbox: Efficient Access to a Large Number of Menu-items," ACM 1999, pp. 231-237.

Charles Rich, Candace L. Sidner, "Adding a Collaborative Agent to Graphical User Interfaces," 1996 ACM, pp. 21-30.

U.S. Official Action mailed Dec. 23, 2003 in U.S. Appl. No. 09/896,384.

U.S. Official Action mailed Aug. 24, 2004 in U.S. Appl. No. 09/896,384.

U.S. Appl. No. 10/982,073, filed Nov. 5, 2004, entitled "Gallery User Interface Controls".

U.S. Appl. No. 10/836,154, filed Apr. 30, 2004, entitled "Combined Content Selection and Display User Interface".

Boyce, "Microsoft Outlook Inside Out," 2001, pp. 67, 68, 109, 110, 230, 231, 310, 316-318, 798.

Halvorson and Young, "Microsoft Office XP Inside Out," 2001, pp. 1005-1009, 1015, 1023-1028, 1036-1039, 1093.

Riggsby, McCoy, Haberman and Falciani, "Mastering Lotus Notes and Domino 6," 2003, pp. 135-139.

U.S. Appl. No. 10/851,442, filed May 21, 2004, entitled "Conversation Grouping of Electronic Mail Records".

Riggsby, McCoy, Haberman and Falciani, "Mastering Lotus Notes and Domino 6," 2003, pp. 135-138, 607-612.

U.S. Appl. No. 10/851,506, filed May 21, 2004, entitled "Adaptive Multi-Line View User Interface".

Examination Report, Jul. 25, 2005.

Search Report, Danish Patent and Trademark Office, Sep. 18, 2006.

Written Opinion, Danish Patent and Trademark Office, Sep. 18, 2006.

Search Report, Danish Patent and Trademark Office, Sep. 19. 2006.

U.S. Appl. No. 10/955,940, filed Sep. 30, 2004, entitled "User Interface for Displaying Selectable Software Functionality Controls that are Contextually Relevant to a Selected Object".

U.S. Appl. No. 10/955,967, filed Sep. 30, 2004, entitled "Command User Interface for Displaying Selectable Software Functionality Controls".

U.S. Appl. No. 10/955,942, filed Sep. 30, 2004, entitled "User Interface for Displaying a Gallery of Formatting Options Applicable to a Selected Object".

U.S. Appl. No. 10/955,928, filed Sep. 30, 2004, entitled "User Interface for Providing Task Management and Calendar Information".

U.S. Appl. No. 10/955,967, filed Sep. 30, 2004, entitled "Command User Interface for Displaying Selectable Software Functionality Controls".

U.S. Official Action mailed Apr. 27, 2006 in U.S. Appl. No. 10/800,056.

Amendment to Office Action of Apr. 27, 2006, dated Jul. 27, 2006 in U.S. Appl. No. 10/800,056.

U.S. Official Action mailed Oct. 19, 2006 in U.S. Appl. No. 10/800,056.

Amendment to Office Action of Oct. 19, 2006, dated Jan. 19, 2007 in U.S. Appl. No. 10/800,056.

U.S. Appl. No. 10/800,056, filed Mar. 12, 2004, entitled "Method and System for Data Binding in a Block Structured User Interface Scripting Language".

Khare and Rifkin, "The Origin of (Document) Species," University of California, 1998 (9 pages).

"Separate Structure and Presentation," http://www.webreference.com/html/tutorial5/1.html, Aug. 20, 1998 (4 pages).

"Style Attribute and CSS Declarations," http://www.webreference.com/html/tutorial5/2, Aug. 20, 1998 (4 pages).

"What's Hot in Internet Services?," http://www.webreference.com/html/tutorial5/3, Aug. 20, 1998 (3 pages).

"The Style Element & CSS Selectors," http://www.webreference.com/html/tutorial5/4.html, Aug. 20, 1998 (e pages).

http://www.webreference.com/html/tutorial5/5html, Aug. 20, 1998 (3 pages.

"ID & Class Selectors, Pseudoclasses," http://www.webreference.com/html/tutorial/5/6.html, Aug. 20, 1998 (3 pages).

http://www.webreference.com/html/tutorial5/7.html, Aug. 20, 1998 (3 pages).

http://www.webreference.com/html/tutorial5/8.html, Aug. 20, 1998 (2 pages).

"External Style Sheets," http://www.webreference.com/html/tutorial5/10.html, Aug. 20, 1998 (3 pages).

Raman, "Cascaded Speech Style Sheets," 1997 (9 pages).

"Primary Windows," http://www-03.ibm.com/servers/eserver/iseries/navigator/guidelines/primary.html, , (23 pages).

"User Interface Standards," http://msdn2.microsoftt.com/en-us/library/aa217660(office.11,d=printer).aspx, Sep. 2001 (5 pages).

"WebSphere Studio Overview," http://researchweb.watson.ibm.com/journal/sj/432/budinsky.html, May 6, 2004.

U.S. Official Action mailed Feb. 14, 2007 in U.S. Appl. No. 10/800,056.

U.S. Office Action dated Jan. 28, 2008 cited in U.S. Appl. No. 10/836,154.
U.S. Appl. No. 12/028,797 filed Feb. 9, 2008 entitled "Side-by-Side Shared Calendars".
U.S. Office Action dated Feb. 21, 2008 cited in U.S. Appl. No. 10/851,442.
Marshall School of Business, Workshop 1—Introduction to Outlook & E-mail, Apr. 6, 2000, pp. 1-11.
Jane Dorothy Calabria Burke, Ten Minute Guide to Lotus Notes 4.6, Publication date: Dec. 23, 1997, 2 pgs.
Bill Dyszel, Microsoft Outlook 2000 for Windows for Dummies, Copyright 1999, pp. 82-86, 102-103, 141, 143.
Gina Danielle Venolia et al., Understanding Sequence and Reply Relationships within Email Conversations: A Mixed-Model Visualization, CHI 2003, Apr. 5-10, 2003, vol. No. 5, Issue No. 1, pp. 361-368.
U.S. Final Office Action dated Apr. 15, 2008 cited in U.S. Appl. No. 10/955,942.
Screendumps Microsoft Corporation, Microsoft Office Professional Edition 2003, 5 pgs.
U.S. Final Office Action dated Apr. 16, 2008 cited in U.S. Appl. No. 10/955,967.
Screendumps Microsoft Corporation, Microsoft Office Professional Edition 2003, 4 pgs.
U.S. Final Office Action dated May 28, 2008 cited in U.S. Appl. No. 10/982,073.
Chinese Official Action dated Mar. 21, 2008 cited in Chinese Application No. 200510092146.4.
Chinese Official Action dated Mar. 21, 2008 cited in Chinese Application No. 200510092139.4.
Philippine Official Action dated Apr. 21, 2008 cited in Philippine Application No. 1-2005-000405.
Philippine Official Action dated Apr. 21, 2008 cited in Philippine Application No. 1-2005-000406.
U.S. Final Office Action dated Apr. 29, 2008 cited in U.S. Appl. No. 10/955,941.
Habraken, Microsoft Office XP 8 in 1, published Jun. 5, 2001, http://proquest.safaribooksonline.com/0789725096/, 12 pgs.
Word 2002, Chapter 14; Paradigm Publishing Inc., copyright 2002; http://www.emcp.com/tech_tutorials/sig_irc/Signature_Word_Chapter_14.ppt, 21 pgs.
Chilean Office Action dated Mar. 28, 2008 cited in Application No. 1770-05, no English Translation.
Chinese First Office Action dated Apr. 11, 2008 cited in Application No. 200510092141.1.
Chinese Office Action dated Apr. 18, 2008 cited in Application No. 200510092142.6.
U.S. Final Office Action dated Jul. 24, 2008 cited U.S. Appl. No. 11/151,686.
Microsoft Office Word 2003. Part of Microsoft Office Professional Edition 2003. Copyright 1983-2003 Microsoft Corporation.
Chinese Office Action dated May 23, 2008 cited in Application No. 200510089514.X.
Philippine Official Action dated Jul. 31, 2008 cited in Philippine Application No. 12005000495.
European Communication dated Jun. 23, 2008 cited in European Application No. 04102463.9-2211/1517239.
U.S. Office Action dated Nov. 25, 2008 cited in U.S. Appl. No. 11/154,278.
U.S. Office Action dated Dec. 11, 2008 cited in U.S. Appl. No. 10/982,073.
Microsoft Office Word 2003, Part of Microsoft Office Professional Edition 2003, 1983-2003 Microsoft Corporation, screen shot 1, 1 pp.
Microsoft Office 2003, Microsoft Office Professional Edition 2003, Microsoft Corporation, 10 pages.
Screendumps—Microsoft Office, Microsoft Office Professional Edition 2003, Microsoft Corporation, 10 pages.
Screendumps—Microsoft Office Outlook, Microsoft Office Outlook Professional Edition 2003, Microsoft Corporation, 2 pages.
Chinese Second Office Action dated Nov. 21, 2008 cited in Appln No. 200510089514.X.
U.S. Official Action dated Jun. 19, 2008 cited in U.S. Appl. No. 10/851,506.
U.S. Official Action dated Jun. 20, 2008 cited in U.S. Appl. No. 10/955,928.
U.S. Official Action dated Jul. 17, 2008 cited in U.S. Appl. No. 10/955,940.
U.S. Official Action dated Dec. 23, 2008 in U.S. Appl. No. 10/955,942.
U.S. Official Action dated Dec. 24, 2008 in U.S. Appl. No. 10/955,967.
U.S. Official Action dated Jan. 6, 2009 in U.S. Appl. No. 10/955,941.
Philippines Examiner's Action dated Sep. 12, 2008 cited in Application No. 1-2005-00406.
Microsoft Office 11 Beta Layperson's Specification, Copyright 2002, Microsoft Corporation, 28 pgs.
FrontPage 11 Beta Layperson's Specification, Copyright 2002, Microsoft Corporation, 12 pgs.
Office 11 Beta Letter, Copyright 2002, Microsoft Corporation, 6 pgs.
Microsoft XDocs Beta Layperson Specification, Copyright 2002, Microsoft Corporation, 3 pgs.
Microsoft Publisher 11 Beta Layperson's Specification, Copyright 2002, Microsoft Corporation, 13 pgs.
Philippines Examiner's Action dated Aug. 19, 2008 cited in Application No. 1-2005-000405.
Chinese Second Office Action dated Oct. 10, 2008 cited in Application No. 200510092141.1.
Chinese Second Office Action dated Oct. 17, 2008 cited in Application No. 200510092139.4.
U.S. Final Office Action dated Oct. 28, 2008 cited in U.S. Appl. No. 11/151,686.
Chilean Office Action dated Nov. 27, 2008 cited in Appln No. 1768-2005.
Chilean Office Action dated Nov. 27, 2008 cited in Appln No. 1769-2005.
U.S. Appl. No. 12/372,386 filed Feb. 17, 2009 entitled "Command User Interface for Displaying Multiple Sections of Software Functionality Controls".
Chinese Office Action dated Apr. 3, 2009 cited in Appin No. 200510089514.X.
U.S. Office Action dated Mar. 18, 2009 in U.S. Appl. No.11/401,470.
U.S. Office Action dated Apr. 7, 2009 in U.S. Appl. No. 10/955,940.
Chilean Second Office Action dated Mar. 4, 2009 cited in Appln No. 2512-2005.
U.S. Office Action dated Apr. 28, 2009 in U.S. Appl. No. 12/028,797.
Nielsen, Jacob. "Tabs, Used Right," Alertbox, Sep. 17, 2007, http://www.useit.com/alertbox/tabs.html, 6 pages.
"Managing the Code Editor and View" Microsoft Corporation, http://msdn.microsoft.com/en-us/library/z01zks9a(VS.71).aspx, 2008.
Agarwal, Vikash K., "Creating a Visually Arresting User-Interface: A₃D Tab Control Example," Jan. 4, 2008, http://microsoft.apress.com/Asptodayarchive/71723/creating-a-visually-arresting-user-interface-a-3d-tab-control-example, 12 pages.
"Omni Web Help," Omni Group, 2004, http://www.omnigroup.com/documentation/omniweb/browser/tabs.htmk, 2 pages.
Hepfner, Troy, "New SOCET CXP Interface Improves Usability," Sep. 2008, http://www.socetst.com/gxpmosaic/?p=95, 4 pages.
Billo, E. Joseph. "Creating Charts: An Introduction," Excel for Chemists: . A Comprehensive Guide, http://www.ahut.edu.cn/yxsz/ahk/Teaching/Excel%for%20Chemists/ChQ2.pdf, 9 pages.
Marsh, Bruce, Integrating Spreadsheet Templates and Data Analysis Into Fluid Power Instruction, Journal of Industrial Technology, vol. 16, No. 4, Aug. 2000-Oct. 2000. http://www.nait.org/jit/Articles/marsh071200.pdf, 7 pages.
Oracle Discoverer Desktop User's Guide; l0g (9.0.4) for Windows; Part No. B10272-01; published 2003; http://download-uk.oracle.com/docs/cd/B12166_01/bi/B10272_01/3graph.htm; pp. 1-18.
Lisa K. Averett; Joshua R. Knisley; Mark A. Marvin; Haiti: Projecting Tactical Network and Systems Management; 1995 IEEE pp. 906-910.
Mexican Office Action dated Feb. 5, 2009 cited in Appln No. PA/a/2005/008349.
Mexican Office Action dated Mar. 3, 2009 cited in Appln No. PA/a/2005/008351 English language only.
Chinese Third Office Action dated Jun. 19, 2009 cited in Appln No. 200510092139.4.

Russian Office Action dated Jun. 24, 2009 cited in Appln No. 2005120363/28(023023).
U.S. Official Action dated Feb. 22, 2008 in U.S. Appl. No. 11/445,393.
U.S. Official Action dated Oct. 8, 2008 cited in U.S. Appl. No. 11/445,393.
U.S. Official Action dated Jun. 1, 2009, U.S. Appl. No. 11/445,393.
U.S. Official Action dated Jun. 8, 2009 in U.S. Appl. No. 10/982,073.
U.S. Official Action dated Jun. 10, 2009 in U.S. Appl. No. 11/154,278.
U.S. Official Action dated Jun. 11, 2009 in U.S. Appl. No. 11/151,686.
U.S. Official Action dated Jun. 24, 2009 in U.S. Appl. No. 10/607,020.
"TeeChart for .NET Charting Control," TeeChart for NET Steema Software. http://Iwww.teechart.net.
"Convert to Word 2007," http://www.regencytraining.com/word-2007-conversion.html, Regency Training and Consulting, 2 pages (Date Printed Apr. 21, 2008).
"Customer Story: SourceXtreme," SourceXtreme - Trolltech, http://trolltech.com/customers/casestories/stories/sourcextreme/?searchterm=sourcextreme, 2 pages (Date Printed Apr. 22, 2008).
"Inter-Widget Communication," http://web.mit.edu/6.115/www/miscfiles/amulet/amulet-help/IWC.htm, 6 pages (Feb. 13, 2007).
"The Technology in Document and Check Security," http://www.securedoc.in/thetechnology.htm, 7 pages (Date Printed Apr. 21, 2008).
Ando, R. et al., "Visualization-enabled multi-document summarization by Iterative Residual Rescaling," Natural Language Engineering, vol. 11, No. 1, pp. 67-86 (Mar. 2005) (2 page Abstract).
Bos, B, "Re: A proposal for addition to HTML 3.0: Frames," http://www.nyct.net/~aray/htmlwg/95q3/1141.html, 5 pages (Sep. 21, 1995).
de Candussio, N., "Common GUI Features Report," Herschel CSDT Meeting, pp. 1-21 (Sep. 2007).
Krill, P., "Microsoft's Ribbon Interface Draws Frowns, Smiles," InfoWorld, http://www.infoworld.com/article/08/03/04/10NF-microsoft-fluentuil_1.html, 3 pages (Mar. 4, 2008).
Rice, F, "Customizing the 2007 Office System Document Inspector," http://msdn2.microsoft.com/enus/library/aa338203(d=printer). aspx, 10 pages (May 2006).
Boyce, "Microsoft Outlook Inside Out," 2001, pp. 133, 134, 721-728.
Halvorson et al., "Microsoft Office XP Inside Out," 2001, pp. 4, 5, 10, 11, 70-74, 281-288, 1010-1014, 1173-1175.
Pogue, David. "Windows XP Home Edition: The Missing Manual," O'Reilly, 1st Edition, May 1, 2002, pp. 37, 38, 41.
Screendumps - Microsoft Office, Microsoft Corporation, Microsoft Office Professional Edition 2003, 13 pages.
PCT Search Report dated Feb. 6, 2007 cited in International Application No. PCT/US2006/035467.
International Search Report dated Nov. 27, 2007 in PCT/US2007/012573, 9 pages.
Supplementary European Search Report dated May 28, 2009 cited in EP Application No. 07795391.Jul. 1225.
Mexican Office Action dated Jun. 19, 2009 cited in Appln. No. PA/a/2005/007073.
Chinese Office Action dated Jul. 3, 2009 cited in Appln. No. 200680018095.3.
Russian Office Action dated Jul. 21, 2009 cited in Appln No. 2005125837/09(029011).
Russian Office Action dated Jul. 30, 2009 cited in Appln No. 2005125831/09(029005).
European Search Report dated Sep. 7, 2009 cited in EP Application No. 09006972.5-2211.
European Communication dated Sep. 14, 2009 cited in Appln. No. 07795391.7-1225.
U.S. Official Action dated Sep. 6, 2007 in U.S. Appl. No. 11/136,800.
U.S. Official Action dated May 30, 2008 cited in U.S. Appl. No. 11/430,562.
U.S. Official Action dated Jun. 27, 2008 cited in U.S. Appl. No. 11/430,416.
U.S. Official Action dated Jul. 9, 2008 cited in U.S. Appl. No. 11/136,800.
U.S. Official Action dated Aug. 4, 2009 in U.S. Appl. No. 10/955,967.
U.S. Official Action dated Aug. 4, 2009 in U.S. Appl. No. 10/955,942.
U.S. Official Action dated Aug. 18, 2009 in U.S. Appl. No. 11/782,059.
U.S. Official Action dated Sep. 23, 2009 in U.S. Appl. No. 11/401,470.
International Search Report dated Oct. 17, 2007 cited in International Application No. PCT/US2006/012724.
Perronne et al. "Building Java Enterprise Systems with J2EE", Publisher: Sams, Pub Date: Jun. 7, 2000 (pp. 1-8).
Russian Office Action dated Oct. 26, 2009 cited in Appln No. 2005120363/09(023023).
PCT Search Report and Written Opinion dated Dec. 29, 2009 cited in International Application No. PCT/US2009/046344.
U.S. Official Action dated Nov. 13, 2009 in U.S. Appl. No. 11/154,278.
U.S. Official Action dated Dec. 8, 2009 in U.S. Appl. No. 11/151,686.
U.S. Official Action dated Dec. 9, 2009 in U.S. Appl. No. 12/028,797.
U.S. Official Action dated Dec. 10, 2009 in U.S. Appl. No. 10/955,940.
U.S. Official Action dated Jan. 6, 2010 in U.S. Appl. No. 10/607,020.
Berliner E.M. et al., "Microsoft Office 2003", Feb. 24, 2004, p. 39-40, 120-124, 175-177, 233-234 [D1].
Berliner E.M. et al., "Microsoft Office 2003", Feb. 24, 2004, p. 173-178 [D2].
Israeli Office Action dated Sep. 6, 2009 cited in Appln No. 169716.
Israeli Office Action dated Sep. 7, 2009 cited in Appln No. 169718.
Russian Office Action dated Sep. 10, 2009 cited in Appln No. 2005125836/09(029010).
Russian Office Action dated Sep. 10, 2009 cited in Appln No. 2005125839/09(029013).
European Communication dated Sep. 28, 2009 cited in Appln No. 09006972.5-2211.
Chinese Office Action dated Oct. 16, 2009 cited in Appln No. 200510092142.6.
U.S. Official Action dated Nov. 24, 2009 in U.S. Appl. No. 11/445,393.
Screendumps—Microsoft Office (Microsoft Corporation, Microsoft Office Professional Edition 2003; 16 pages).
Russian Office Action dated Dec. 28, 2009 cited in Appln No. 2005125836/09(029010).
Chilean Second Office Action dated Jan. 29, 2010 cited in Appln No. 1769-2005.
U.S. Official Acton dated Jan. 7, 2010 in U.S. Appl. No. 11/430,562.
U.S. Official Action dated Jan. 20, 2010 in U.S. Appl. No. 10/955,967.
U.S. Official Action dated Jan. 25, 2010 in U.S. Appl. No. 10/982,073.
U.S. Official Action dated Feb. 18, 2010 in U.S. Appl. No. 11/782,059.
U.S. Official Action dated Feb. 19, 2010 in U.S. Appl. No. 10/955,942.
U.S. Official Action dated Feb. 22, 2010 in U.S. Appl. No. 11/401,470.

* cited by examiner

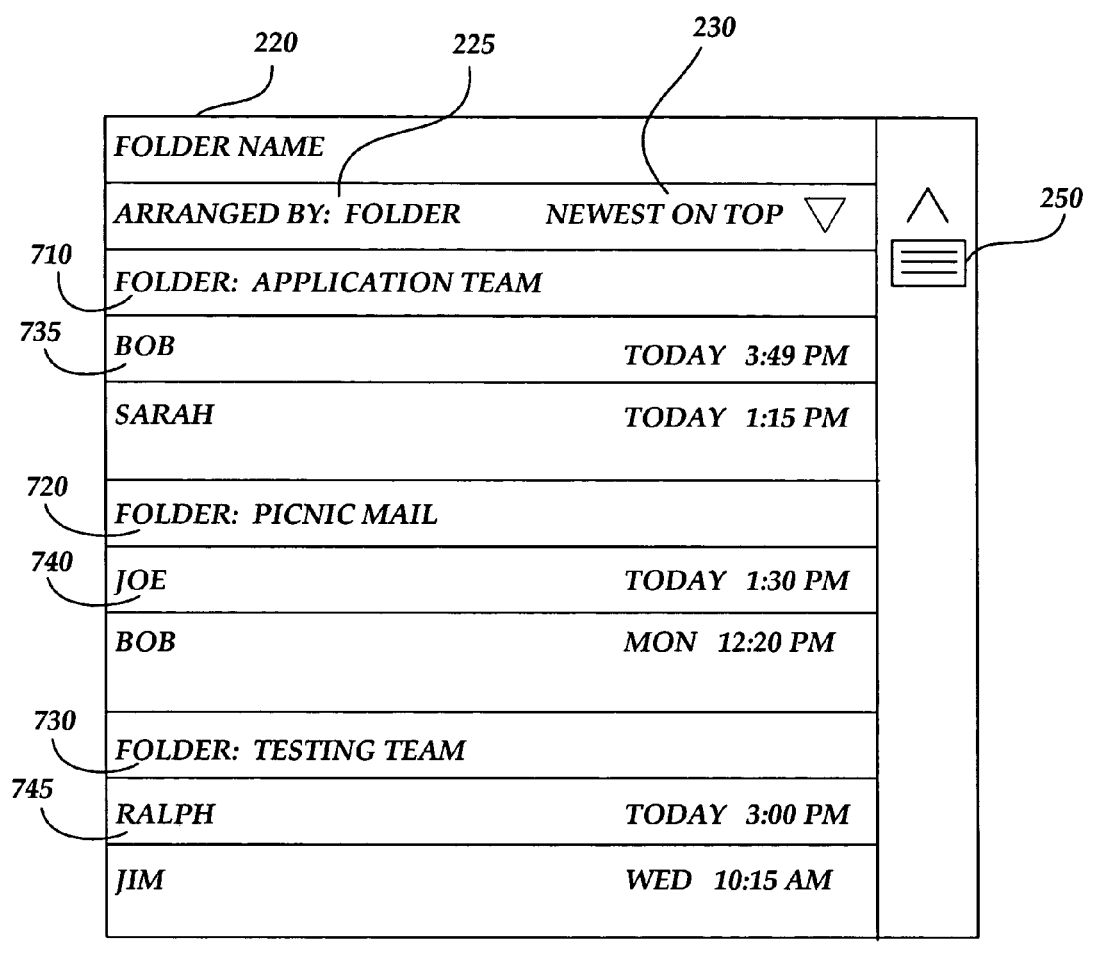

| | | |
|---|---|---|
| FOLDER NAME | | |
| ARRANGED BY: FOLDER | NEWEST ON TOP ▽ | |
| FOLDER: APPLICATION TEAM | | |
| BOB | TODAY 3:49 PM | |
| SARAH | TODAY 1:15 PM | |
| FOLDER: PICNIC MAIL | | |
| JOE | TODAY 1:30 PM | |
| BOB | MON 12:20 PM | |
| FOLDER: TESTING TEAM | | |
| RALPH | TODAY 3:00 PM | |
| JIM | WED 10:15 AM | |

*Fig. 7*

AUTOMATIC GROUPING OF ELECTRONIC MAIL

CROSS-REFERENCE TO RELATED APPLICATIONS

The present invention claims priority from U.S. Provisional Patent Application No. 60/484,437, entitled "Combined Outlook Bar and Folder List, Automatic Grouping, Adaptive Multi-Line View, Threaded View with Easier Access to All New Email, Search Folders," filed Jul. 1, 2003, which is incorporated herein by referenced.

FIELD OF THE INVENTION

The present invention generally relates to electronic mail systems. More particularly, the present invention relates to automatic grouping of electronic mail in an electronic mail system.

BACKGROUND OF THE INVENTION

With the advent of the computer age, computer software users have grown accustomed to user-friendly software applications that help them write, calculate, organize, prepare presentations, send and receive electronic mail, make music, and the like. For example, modem electronic mail programs allow users to send and receive electronic mail to and from other users. Modem electronic mail programs also allow users to store sent or received mail in a variety of user-established storage folders.

Prior electronic mail systems typically provide a user interface through which a user may see and select received mail, sent mail, or stored mail. Such user interfaces may be used to display a listing of all electronic mail received, sent or stored in one or more user-established mail storage folders. A user may sort listed mail items using a number of sorting properties. For example, mail may be sorted by date received or date sent. Mail may be sorted by the name of the party from which mail is received or by the name of the party to which mail is sent. Mail may be sorted according to other sorting properties such as size of individual mail items or subject matter of mail items.

Electronic mail users often have large numbers of mail items in their received mail, sent mail and/or various mail folders. In order to find a particular mail item in any of the these mail categories, the user may scroll up or down through all mail items in a given category (e.g., received, sent, selected folder), or the user may first sort the mail, as described above, and then scroll up or down as desired. For example, if a user is looking for a particular mail item from her colleague, Bob, she may first sort her received mail based on a "received from" sorting property, followed by scrolling through all mail received from Bob to find the particular mail item. Unfortunately, if she has received numerous mail items from Bob, her task of locating the desired mail item may be time consuming, inefficient and cumbersome.

There is a need for an improved electronic mail user interface and mail viewing model that allows electronic mail to be automatically sorted and grouped into mail categories or arrangements that allow a user to more easily and efficiently locate desired mail items. It is with respect to these and other considerations that the present invention has been made.

SUMMARY OF THE INVENTION

Embodiments of the present invention solve the above and other problems by providing automatic sorting and grouping of electronic mail items in an electronic mail system. According to aspects of the invention, an automatic mail grouping property may be selected for electronic mail received, sent or stored in a variety of storage folders. For a given mail location (e.g., received mail, sent mail, or a given mail storage folder), a selected automatic grouping property causes mail to be displayed to the user in one or more categories that make location of specific mail items easier and more efficient. Visible dividers with optional headings may be provided between mail categories to quickly draw a user's attention to a given mail category and to separate large numbers of mail into logical groupings to make location of specific mail items more manageable.

According to one aspect of the invention, a user may automatically group mail items that are received, sent, or stored according to date. Mail selected for automatic grouping according to date may be divided into logical groupings such as mail received today, mail received yesterday, mail received earlier this week, mail received last week, and so on. Thus, if a user knows that a given mail item was received from her colleague yesterday, she may select automatic grouping by date and quickly go to mail items received yesterday to find the desired item.

According to another aspect of the invention, a user may automatically group mail items that are received, sent or stored according to the party from which the mail items were received or to which the mail items were sent. Mail is divided into logical groupings such as mail received from a first party, mail received from a second party, mail received from a third party, and the like. Likewise, mail grouped according to the party to which mail was sent may be divided into logical groupings such as mail sent to a first party, mail sent to a second party, mail sent to a third party, and the like. Easy to read headings may be provided above each grouping to allow the user to quickly locate a desired mail item according to the identity of the party from which the mail received was received or to which the mail was sent.

Other automatic grouping categories include groupings by folder identification, groupings by mail size, groupings by mail subject, groupings by mail type, groupings by flagged mail, groupings by mail with or without attachments, groupings by importance level, or groupings according to identified mail conversation strings. For example, mail grouped by importance level may be displayed in three groupings divided by headings such as "high importance", "normal importance", and "low importance."

According to another aspect of the invention, automatic grouping categories or arrangements may be customized by a user. For example, the user may customize an automatic grouping such that mail items are first grouped or categorized according to date of receipt, followed by sub-grouping based on importance level. Thus, according to this example customized grouping, mail items are first grouped and divided according to date received or sent, followed by a further grouping within each first grouping according to importance levels associated with mail items grouped in each first grouping.

According to another aspect of the invention, processing of selected automatic mail groupings and persistence of data representing resulting mail groupings may be performed and stored at an electronic mail system server. Alternatively, some automatic grouping processing, for example, processing of automatic grouping by date or size may be performed and associated data may be persisted on a client side electronic mail system, while other automatic grouping processing and associated data may be performed and persisted on a server side electronic mail system.

These and other features and advantages, which characterize the present invention, will be apparent from a reading of the following detailed description and a review of the associated drawings. It is to be understood that both the foregoing general description and the following detailed description are exemplary and explanatory only and are not restrictive of the invention as claimed.

BRIEF DESCRIPTION OF THE DRAWINGS

FIG. 7 illustrates a computer screen display showing an electronic mail user interface for displaying mail items grouped according to storage folders to which given electronic mail items are saved.

DETAILED DESCRIPTION

As briefly described above, embodiments of the present invention are directed to automatic grouping of electronic mail items in an electronic mail system. According to embodiments of the present invention, electronic mail items received, sent or stored in a variety of mail storage folders may be automatically sorted and grouped based on a number of sorting and grouping properties such as date, size, identity of party from which mail is received or to which mail is sent, folder identification, mail subject, mail type, mail flag type, presence or absence of mail attachments, or mail importance level. Customized automatic grouping arrangements may be created and applied to electronic mail items according to user specification.

In the following detailed description, references are made to the accompanying drawings that form a part hereof, and in which are shown by way of illustrations specific embodiments or examples. These embodiments may be combined, other embodiments may be utilized, and structural changes may be made without departing from the spirit or scope of the present invention. The following detailed description is therefore not to be taken in a limiting sense and the scope of the present invention is defined by the appended claims and their equivalents.

Figure 1:
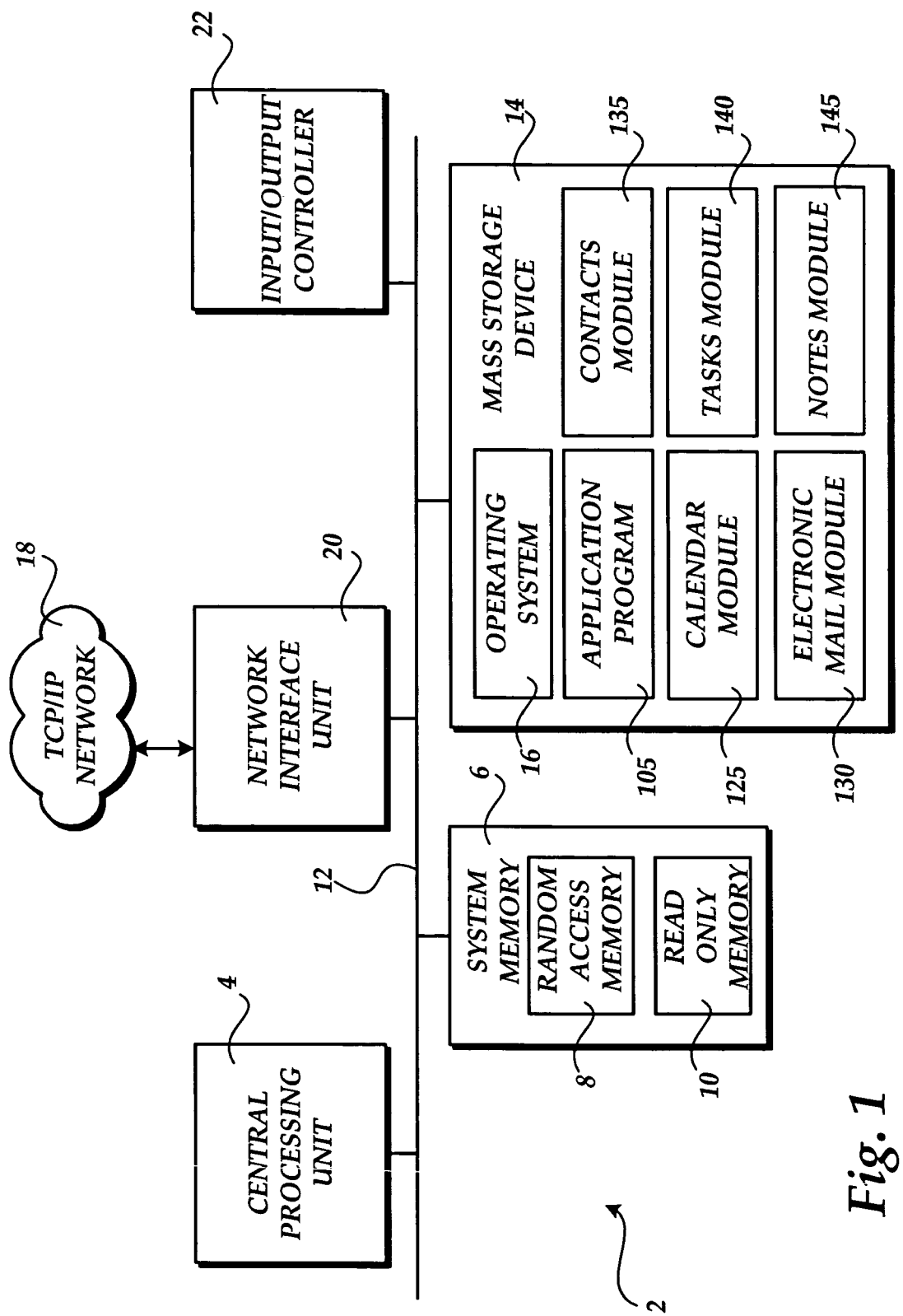
FIG. 1 illustrates an exemplary computing operating environment for embodiments of the present invention.

Referring now to the drawings, in which like numerals represent like elements through the several figures, aspects of the present invention and the exemplary operating environment will be described. FIG. 1 and the following discussion are intended to provide a brief, general description of a suitable computing environment in which the invention may be implemented. While the invention will be described in the general context of program modules that execute in conjunction with an application program that runs on an operating system on a personal computer, those skilled in the art will recognize that the invention may also be implemented in combination with other program modules.

Generally, program modules include routines, programs, components, data structures, and other types of structures that perform particular tasks or implement particular abstract data types. Moreover, those skilled in the art will appreciate that the invention may be practiced with other computer system configurations, including hand-held devices, multiprocessor systems, microprocessor-based or programmable consumer electronics, minicomputers, mainframe computers, and the like. The invention may also be practiced in distributed computing environments where tasks are performed by remote processing devices that are linked through a communications network. In a distributed computing environment, program modules may be located in both local and remote memory storage devices.

Turning now to FIG. 1, an illustrative computer architecture for a personal computer 2 for practicing the various embodiments of the invention will be described. The computer architecture shown in FIG. 1 illustrates a conventional personal computer, including a central processing unit 4 ("CPU"), a system memory 6, including a random access memory 8 ("RAM") and a read-only memory ("ROM") 10, and a system bus 12 that couples the memory to the CPU 4. A basic input/output system containing the basic routines that help to transfer information between elements within the computer, such as during startup, is stored in the ROM 10. The personal computer 2 further includes a mass storage device 14 for storing an operating system 16, application programs, such as the application program 205, and data.

The mass storage device 14 is connected to the CPU 4 through a mass storage controller (not shown) connected to the bus 12. The mass storage device 14 and its associated computer-readable media, provide non-volatile storage for the personal computer 2. Although the description of computer-readable media contained herein refers to a mass storage device, such as a hard disk or CD-ROM drive, it should be appreciated by those skilled in the art that computer-readable media can be any available media that can be accessed by the personal computer 2.

By way of example, and not limitation, computer-readable media may comprise computer storage media and communication media. Computer storage media includes volatile and non-volatile, removable and non-removable media implemented in any method or technology for storage of information such as computer-readable instructions, data structures, program modules or other data. Computer storage media includes, but is not limited to, RAM, ROM, EPROM, EEPROM, flash memory or other solid state memory technology, CD-ROM, DVD, or other optical storage, magnetic cassettes, magnetic tape, magnetic disk storage or other magnetic storage devices, or any other medium which can be used to store the desired information and which can be accessed by the computer.

According to various embodiments of the invention, the personal computer 2 may operate in a networked environment using logical connections to remote computers through a TCP/IP network 18, such as the Internet. The personal computer 2 may connect to the TCP/IP network 18 through a network interface unit 20 connected to the bus 12. It should be appreciated that the network interface unit 20 may also be utilized to connect to other types of networks and remote computer systems. The personal computer 2 may also include an input/output controller 22 for receiving and processing input from a number of devices, including a keyboard or mouse (not shown). Similarly, an input/output controller 22 may provide output to a display screen, a printer, or other type of output device.

As mentioned briefly above, a number of program modules and data files may be stored in the mass storage device 14 and RAM 8 of the personal computer 2, including an operating system 16 suitable for controlling the operation of a networked personal computer, such as the WINDOWS operating systems from Microsoft Corporation of Redmond, Wash. The mass storage device 14 and RAM 8 may also store one or more application programs. In particular, the mass storage device 14 and RAM 8 may store an application program 105 for providing a variety of functionalities to a user. For instance, the application program 105 may comprise many types of programs such as a word processing application program, a spreadsheet application, a desktop publishing, and the like. According to an embodiment of the present invention, the application program 105 comprises a multiple functionality software application for providing a user calendaring functionality, electronic mail functionality, contacts information functionality, electronic notes functionality, electronic journal functionality and the like. Some of the individual program modules comprising the multiple functionality program 105 include a calendar module 125, an electronic mail program 130, a contacts module 135, a tasks module 140, a notes module 145 and a journal module (not shown). An example of such a multiple functionality program 105 is OUTLOOK® manufactured by Microsoft Corporation.

Figure 2:
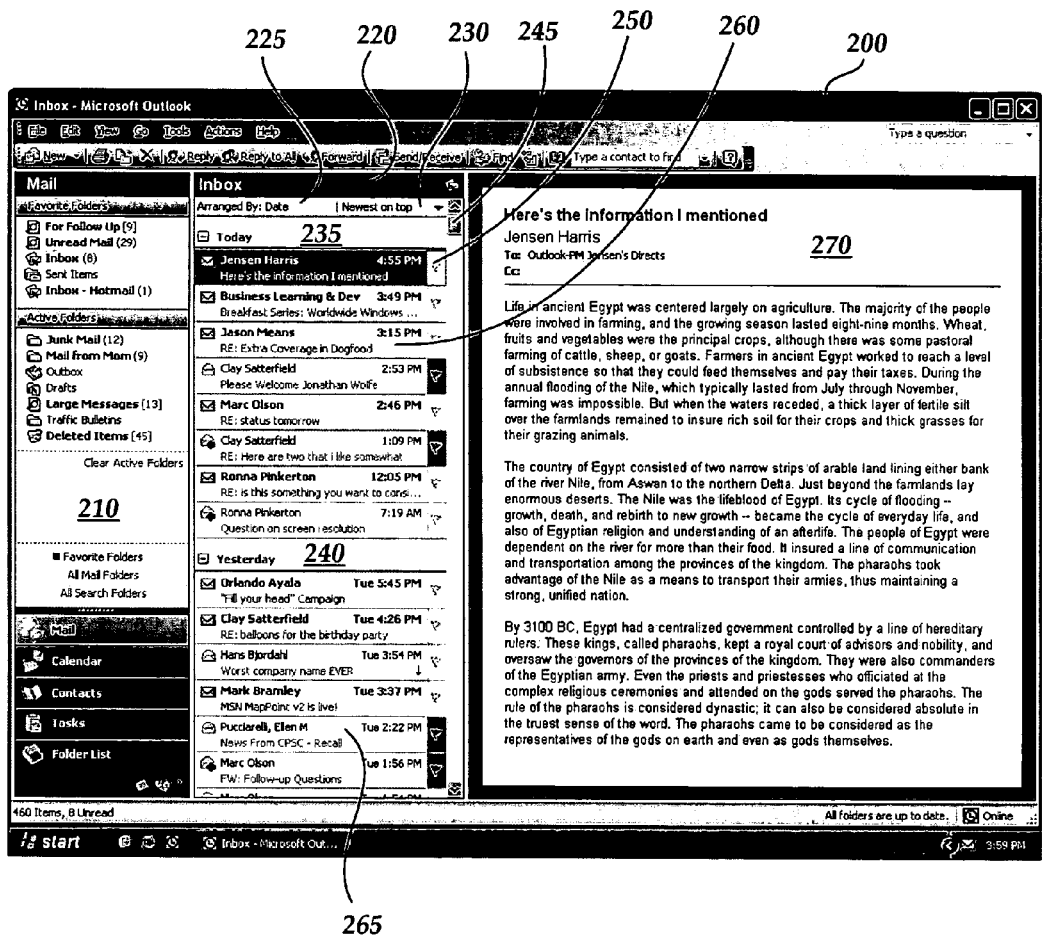
FIG. 2 illustrates a computer screen display of an electronic mail system user interface according to embodiments of the present invention.

FIG. 2 illustrates a computer screen display of an electronic mail system user interface according to embodiments of the present invention. The user interface 200 is illustrative of an electronic mail program 130 user interface for displaying electronic mail items received, sent or stored in a variety of storage folders. An example electronic mail program user interface illustrated in FIG. 2 is provided by OUTLOOK® manufactured and marketed by Microsoft Corporation of Redmond, Wash.

The user interface 200 illustrated in FIG. 2 includes a combined content selection and display pane 210 through which a user may select other types of functionality provided by a multiple functionality software application (described above) through which the user's electronic mail program is provided. For example, through the combined contents selection and display pane 210, the user may select calendar functionality, contacts functionality, tasks functionality, notes functionality, and the like.

According to embodiments of the present invention, a user interface or pane 220 is provided with which the user may view a listing of electronic mail items that have been received by the user, that have been sent by the user, or which have been stored in one or more user-established storage folders. The user interface or pane 220 illustrated in FIG. 2 is illustrative of an electronic mail system inbox with which the user may display and review a listing of electronic mail items received by the user. As illustrated in FIG. 2, a number of electronic mail items such as the mail item 260 and mail item 265 are listed in the inbox pane 220. A scroll button 245 is illustrated for allowing the user to scroll up or down through mail items listed in the inbox pane 220. To the right of the inbox pane 220, a preview pane 270 is illustrated for displaying the contents of a selected mail item. As is appreciated by those skilled in the art, if the user has activated the preview pane functionality, the user may receive a preview of the contents of a selected mail item by focusing on the mail item in the inbox pane 220.

According to embodiments of the present invention, an "Arranged by" field 225 is provided along an upper edge of the inbox pane 220. When the user selects a given automatic grouping arrangement type, as described below, the selected arrangement type is identified in the "Arranged by" field. For example, referring to FIG. 2, an arrangement type of "date" has been selected by the user and is thus identified in the "Arranged by" field 225. Adjacent to the "Arranged by" field 225 is a field 230 for identifying an overall sorting property applied to mail items displayed in the pane 220. For example, if mail items displayed in the pane 220, regardless of automatic grouping arrangement type, are displayed in a newest mail item on top orientation, the text in the field 230 reads "Newest on top." Conversely, if mail items in the pane 220 are displayed according to a newest mail item at the bottom where oldest mail items are pushed to the top of the listing, the text in the field 230 may read "Newest on bottom", or "Oldest on top." Whether mail is sorted with newest items on top or oldest items on top may be selectively changed by the user by toggling the field 230 or the associated toggling switch located on the right side of the text contained in the field 230. As should be appreciated, the text utilized in the field 230 to describe the listing ordering is by way of example only and is not restrictive of the numerous text selections that may be used to describe the ordering of the text listed in the pane 220. For example, the text items contained in the pane 220 may similarly be ordered by such properties as "A on top, Z on bottom," "Unflagged on top," "Attachments on top" and the like.

As described below with reference to FIG. 4, the inbox pane 225 illustrated in FIG. 2 contains mail items received by the user automatically grouped according to date of receipt. The mail items are further grouped into logical sub-groupings to make review of the listed items for efficient and user-friendly. For example, all mail items received by the user today are listed under a visible heading 235 bearing the heading "Today." Similarly, mail items received by the user yesterday are listed under a visible heading 240 bearing the heading "Yesterday." As described below with reference to FIG. 4, additional grouping categories for grouping mail items according to date of receipt may be utilized such as "Mail received earlier this week," "Mail received last week," "Mail received last month," and so on.

Mail items contained under each sub-grouping, such as the "Today" grouping 235 and the "Yesterday" grouping 240 may be collapsed underneath the prescribed heading. For example, selection of the collapse or expand icon displayed to the left of the "Today" heading causes all mail items under the "Today" heading 235 to collapse such that only the "Today" heading 235 is displayed to the user. Similarly, all other displayed categories may likewise be collapsed if desired by the user for management of space utilized by the user interface or pane 220. For example, if the user is momentarily only interested in mail received yesterday, the user may collapse the "Today" mail category 235 in order to allow more user interface space for mail items displayed under the "Yesterday" mail category.

Figure 3:
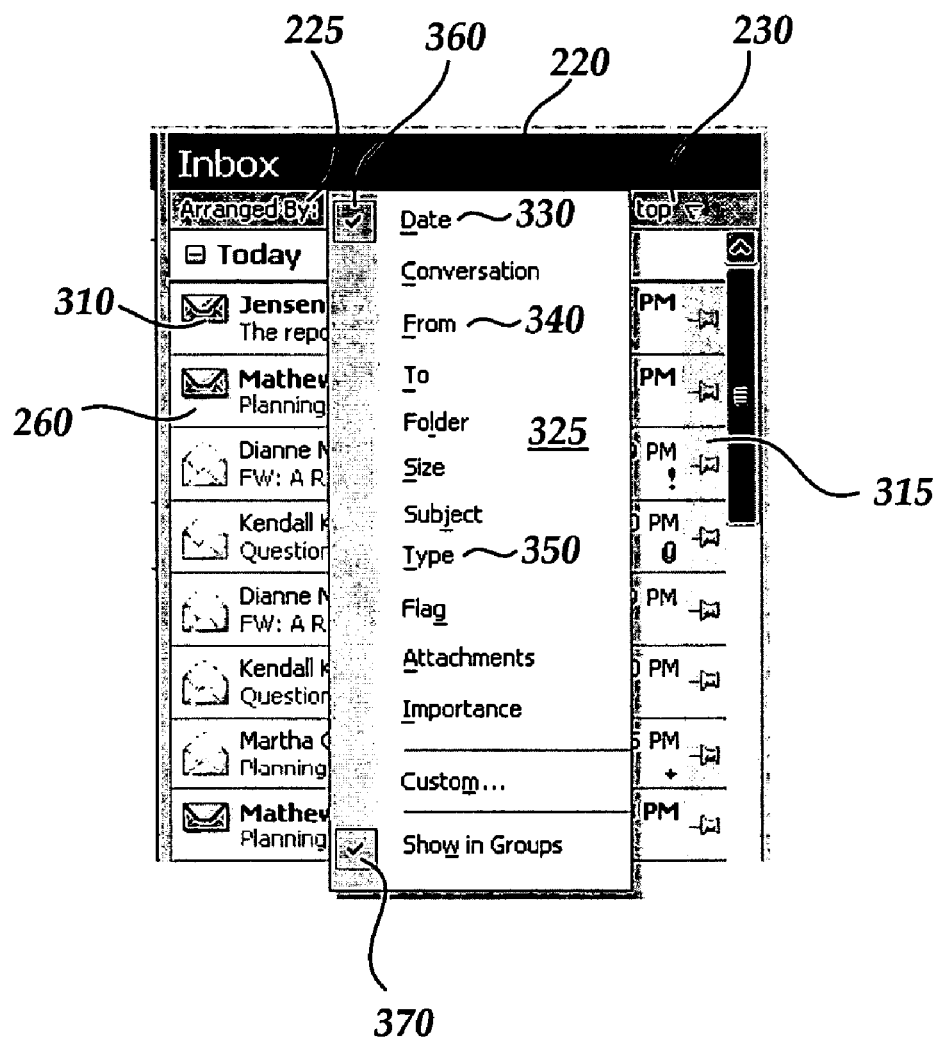
FIG. 3 illustrates a computer screen display showing an electronic mail system inbox and a drop-down user interface menu for selecting a desired automatic grouping arrangement according to embodiments of the present invention.

FIG. 3 illustrates a computer screen display showing an electronic mail system inbox and a drop-down menu for selecting a desired automatic grouping arrangement according to embodiments of the present invention. As described above with reference to FIG. 2, according to embodiments of the present invention, an electronic mail system user may select one of a number of automatic mail grouping arrangements for applying to electronic mail received by the user or sent by the user, or the user may apply one or a number of automatic grouping properties to electronic mail stored by the user in a variety of mail storage folders. Referring to FIG. 3, in order to select a given automatic mail grouping arrangement, the user may select the "Arranged by" field 225 to open a drop-down menu 325 of automatic mail grouping arrangement types. As illustrated in FIG. 3, arrangement types that may be selected by the user include a "Date" arrangement, "Conversation" arrangement, "From" arrangement, "To" arrangement, "Folder" arrangement, "Size" arrangement, "Subject" arrangement, "Type" arrangement, "Flag" arrangement, "Attachments" arrangement, "Importance" arrangement, and "Custom" arrangement.

A check box 360 is illustrated adjacent to a presently selected mail grouping arrangement type. For example, because the "Date" arrangement has been selected by the user according to the illustrated user interface in FIG. 3, the check box 360 is checked next to the "Date" arrangement type 330. If the user selects a different arrangement type, such as the "Attachments" arrangement type, the check box 360 will appear adjacent to the "Attachments" arrangement type. An additional check box 370 is disposed adjacent to the "Show in groups" arrangement type. Selection of the "Show in groups" arrangement type causes automatic grouping according to the selected arrangement type to occur. That is, if the "Show in groups" arrangement type is not selected, electronic mail will be sorted according to the selected arrangement type, but automatic grouping will not be performed. For example, if the "Date," arrangement t e is selected, but the "Show in groups" arrangement type is not selected, the electronic mail to which the "Date" arrangement type is applied will be sorted according to the date upon which electronic mail is received, but the mail will not be grouped into sub-groupings such as "Today," "Yesterday," "Earlier this week," and the like. Selection of the "show in groups" arrangement type causes the electronic mail sorted according to the selected arrangement type to be further grouped into sub-groups under the arrangement type, as described herein.

Referring still to FIG. 3, a number of additional icons such as the envelope icon 310, the paperclip icon, and the thumbtack icon may be utilized to indicate properties of listed electronic mail. For example, a closed envelope icon 310 may indicate that the associated electronic mail item has not been read. An open envelope icon may indicate that an associated electronic mail item has been read. A paperclip icon may be utilized to indicate that an attachment is associated with the selected electronic mail item, and so on. As should be appreciated by those skilled in the art, the arrangement types and property icons illustrated in FIGS. 2 through 14 are for purposes of illustration only and are not limiting of the invention as claimed herein. That is, additional electronic mail groupings and arrangement types may be utilized in accordance with embodiments of the present invention without departing from the scope or spirit of the invention claimed herein. Likewise, any number of computer-generated icons such as the envelope icon 310 may be defined for signifying one or more properties applied to or associated with a given electronic mail item.

Each mail grouping arrangement type illustrated in FIG. 3 is described below with reference to FIGS. 4 through 14. As should be appreciated, the user interface drawings illustrated in FIGS. 4 through 14 are for purposes of example only, and actual implementations of the example user interfaces may differ greatly in terms of layout, coloring and inclusion of a variety of useful user interface icons. Also, as should be understood, text selections illustrated and described herein for mail sub-grouping headings, for example "Today" or "Mail from Bob" are for purposes of example only and may be varied greatly depending on the nature of the mail items listed under a given heading. Additionally, electronic mail items grouped under a given sub-grouping heading may be sorted according to different sorting properties. As will be described with reference to FIG. 14 below, customized grouping properties may be created and used. According to an embodiment of the present invention, a default property is utilized unless otherwise changed wherein electronic mail items grouped under a given electronic mail sub-grouping heading are sorted according to date received, or date sent (for a date sent user interface).

Figure 4:
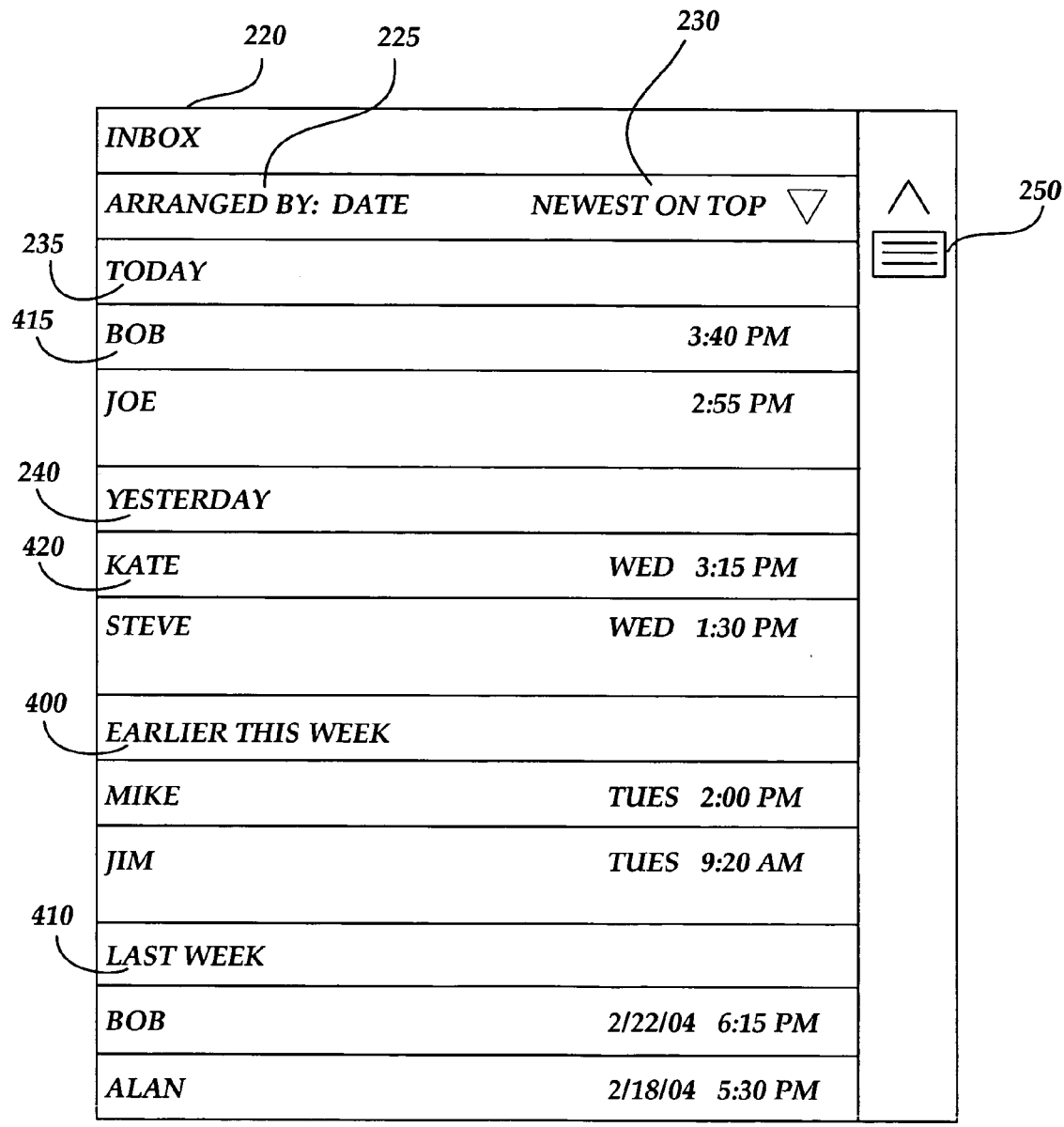
FIG. 4 illustrates a computer screen display showing an electronic mail user interface for displaying mail items grouped by date of receipt.

FIG. 4 illustrates a computer screen display showing an electronic mail user interface for displaying mail items grouped by date of receipt. According to the example inbox pane 220 illustrated in FIG. 4, a "Date" arrangement type has been selected for automatically grouping electronic mail received by the user. Likewise, the user has selected that electronic mail be shown in groups. Selection of the date arrangement type causes electronic mail received by the user to be displayed in "Date" order. As appreciated by those skilled in the art, the date ordered electronic mail may be displayed with the newest mail is displayed from the top and the oldest mail displayed at the bottom. Conversely, oldest mail may be displayed at the top with newest mail displayed at the bottom.

Referring to FIG. 4, the "Arranged by" field 225 shows the selected "Date" arrangement type. As described above, because the user has selected that electronic mail be shown in groups, a number of mail sub-group headings are displayed to further logically organize the electronic mail received by the user. For example, a "Today" heading 235 is shown over mail items 415 received by the user today. A "Yesterday" heading 240 is displayed over mail items 420 received by the user yesterday. An "Earlier this week" heading 400 is displayed over mail items received by the user earlier in the week prior to yesterday. And, a "Last week" heading 410 is displayed over electronic mail items received by the user last week. As should be appreciated, a number of other headings may be utilized such as "Last month" for mail items received last month, "Last year" for mail items received last year, and so on. Additionally, as described above with reference to FIG. 2, according to embodiments of the present invention, each sub-grouping may be collapsed such that only the group heading is displayed such that individual mail items under the collapsed heading are not visible until the collapsed group is expanded by the user.

Figure 5:
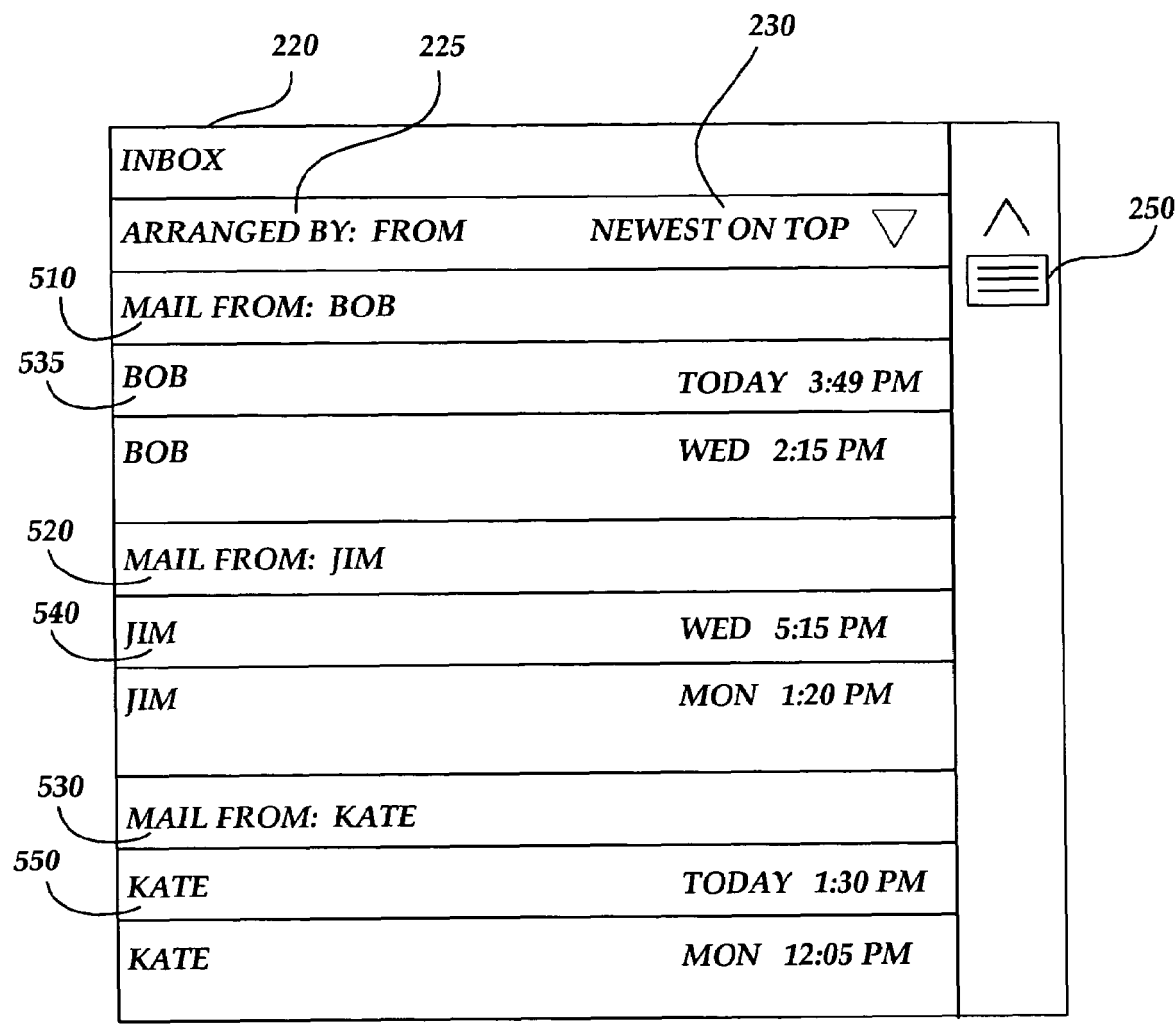
FIG. 5 illustrates a computer screen display showing an electronic mail user interface for displaying mail items grouped by identity of party from which mail is received.

FIG. 5 illustrates a computer screen display showing an electronic mail user interface for displaying mail items grouped by identity of party from which mail is received. According to the user interface or pane 220 illustrated in FIG. 5, a user has selected a "From" arrangement type for grouping the user's received electronic mail according to the party from which the mail has been received. Because the user has also selected that arranged mail should be shown in groups, the electronic mail illustrated in FIG. 5 is displayed in a number of logical sub-groupings. For example, a "Mail from Bob" heading 510 is displayed above mail items 535 received from Bob. A "Mail from Jim" heading 520 is displayed above mail items 540 received from Jim. A "Mail from Kate" heading 530 is displayed above mail items 550 received from Kate. Thus, the user of the arrangement type illustrated in FIG. 5 may quickly locate mail from a given mail sender without the need for perusing or scrolling through large numbers of mail items, and the use of the mail grouping headings 510, 520, 530 allows the user to readily locate a section of the displayed mail items of interest to the user.

Figure 6:
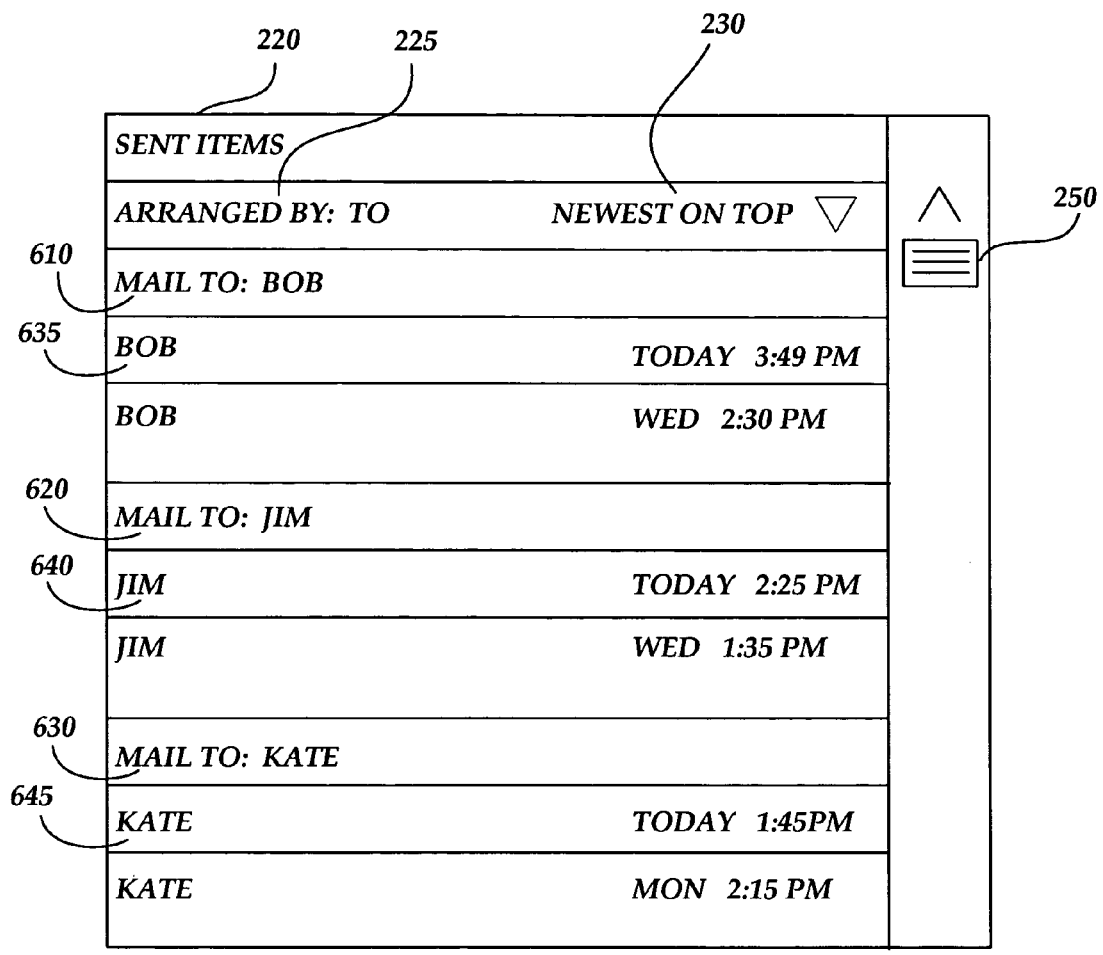
FIG. 6 illustrates a computer screen display showing an electronic mail user interface for displaying mail items grouped by identity of party to which mail is set

FIG. 6 illustrates a computer screen display showing an electronic mail user interface for displaying mail items grouped by identity of party to which mail is sent. According to the example sent items pane 220 illustrated in FIG. 6, a user has selected that her "Sent items" mail items be arranged according to the party to which given mail items have been sent. Without the selection of the "Show in groups" arrangement type illustrated in FIG. 3, individual sent mail items would be arranged in alphabetical order in the order in which individual mail items are sent. Because the user has selected that the sent items are to be shown in groups in addition to being arranged according to the party to which the items have been sent, the user's sent items mail is arranged according to a number of sub-group headings 610, 620, 630. For example, a first heading "Mail to Bob" is displayed above mail items 635 sent to Bob. A second heading "Mail to Jim" is displayed above mail items 640 sent to Jim. A third heading "Mail to Kate" 630 is displayed above mail items sent to Kate. Thus, the user may readily locate a particular mail item sent to a particular party by locating a heading with the particular party followed by a review of mail items contained under the selected heading. The individual mail items displayed under the group headings 610, 620, 630 are listed in date order with the newest items on top. As should be appreciated, by toggling the "Newest on top" field 230, the user may reverse the ordering so that mail items listed under individual group headings are displayed with the oldest mail items on top and the newest mail items on bottom.

FIG. 7 illustrates a computer screen display showing an electronic mail user interface for displaying mail items grouped according to storage folders to which given electronic mail items are saved. According to the user interface or pane 220 illustrated in FIG. 7, the user has selected that electronic mail items be arranged by the "Folder" arrangement type. Accordingly, the "Arranged by" field 225 shows that the "Folder" arrangement type has been selected. According to this arrangement type, electronic mail received by the user or sent by the user that is stored in a number of different user-established electronic mail folders may be displayed in the pane 220 and may be grouped according to folder identification. For example, a first folder heading 710 may be displayed over electronic mail items 735 belonging to a first user folder. A second folder heading 720 may be displayed over electronic mail items 740 belonging to a second user folder. A third folder heading 730 may be displayed over electronic mail items 745 belonging to a third folder 730, and so on. By selecting the "Folder" arrangement type, the user may review in a single user interface or pane 220 all mail items across a number of user-specified mail folders, and the user may quickly review mail contained in different folders through use of the automatic grouping headings such as the headings 710, 720, 730. For a detailed description of methods of systems for viewing electronic mail items in a single user interface 220 across a number of electronic mail folders, see U.S. patent application, Ser. No. 10/741,407, entitled "Methods, Systems, and Computer-Readable Mediums For Persisting and Continuously Updating Search Folders, Applicant Reference No. 301749.01, which is incorporated herein by reference as if fully set out herein.

Figure 8:
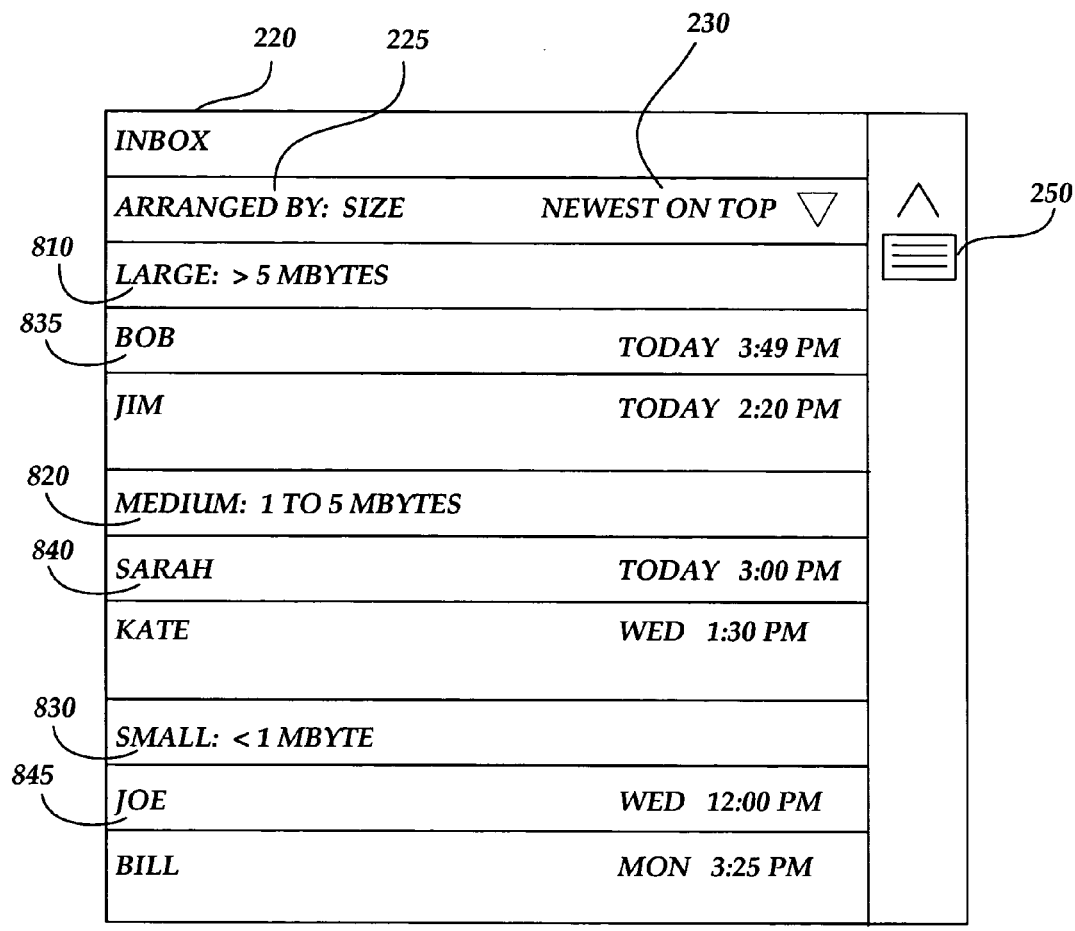
FIG. 8 illustrates a computer screen display showing an electronic mail user interface for displaying mail items grouped according to mail item size.

FIG. 8 illustrates a computer screen display showing an electronic mail user interface for displaying mail items grouped according to mail item size. According to the user interface or pane 220 illustrated in FIG. 8, a user has selected a "Size" arrangement type and the "Show in groups" arrangement type for sorting and grouping the user's electronic mail items according to the size of the electronic mail. As illustrated in FIG. 8, the "Arranged by" field 225 shows that the size arrangement type has been selected. Electronic mail items displayed in the user interface 220 are displayed in the order of size of the displayed electronic mail items. By default, the largest electronic mail items may be shown on top and the smallest electronic mail items may be shown on the bottom of the list of electronic mail items. By toggling the "Newest on top" field 230, the order of display may be reversed. Because the user has also selected that electronic mail items are to be shown in groups, the electronic mail items displayed to the user are arranged under a number of mail groupings. As should be appreciated, each mail grouping may be arranged according to a selected or default mail size. For example, a first mail grouping 810 may be displayed for mail items 835 that are five (5) megabytes or larger. A second mail grouping 820 may be displayed for mail items having a size between one (1) and five (5) megabytes. A third mail grouping 830 may be displayed for mail items having a size of less than one (1) megabyte. As should be appreciated, the size groupings illustrated in FIG. 8 are for purposes of example only, and a number of size variations for various size groupings may be utilized according to embodiments of the present invention.

Figure 9:
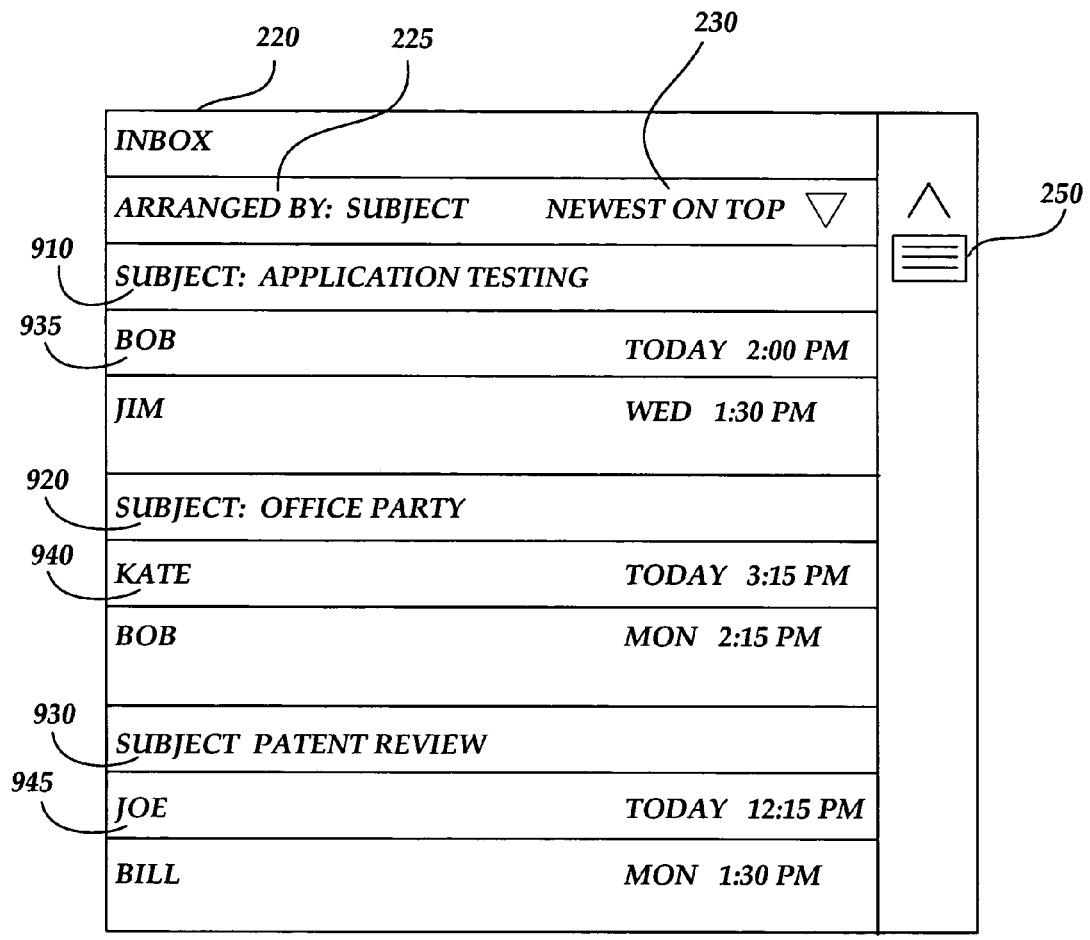
FIG. 9 illustrates a computer screen display showing an electronic mail user interface for displaying mail items grouped according to mail subject.

FIG. 9 illustrates a computer screen display showing an electronic mail user interface for displaying mail items grouped according to mail subject. According to the user interface illustrated in FIG. 9, the user has selected that her electronic mail be sorted and grouped according to the subject of the electronic mail items. As illustrated in FIG. 9, the "Arranged by" field identifies "Subject" as the arrangement type. In addition to selecting that the electronic mail be sorted by subject, the user has selected that the electronic mail be shown in groups. A first subject heading 910 is displayed above electronic mail items 935 having subjects identified by the subject heading 910. A second subject heading 920 is displayed above electronic mail items 940 having electronic mail subjects identified by the subject heading 920. A third subject heading 930 is displayed above the electronic mail items 945 having subjects identified by the heading 930. For example, the subject heading 910 includes an example subject heading of "Application Testing." Each electronic mail message received by the user having a subject of "Application Testing" is sorted and is grouped underneath the subject heading 910. Thus, the user may quickly identify and retrieve a given email message under the desired subject heading without the need for scrolling through many email messages pertaining to different subject matters.

Figure 10:
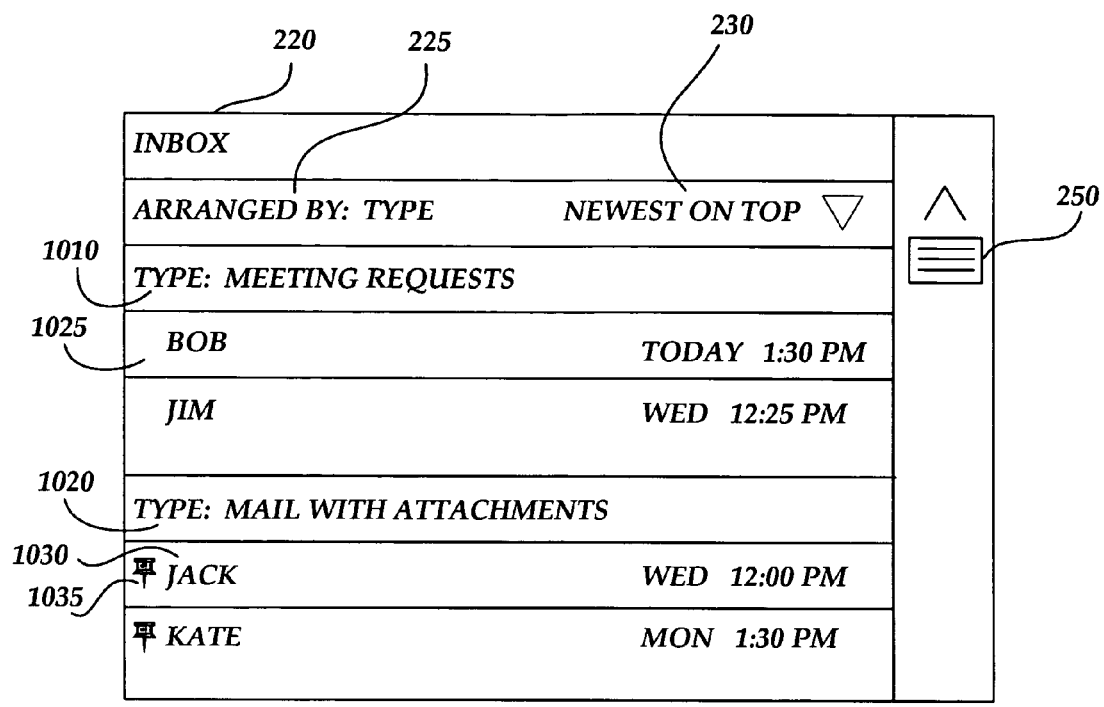
FIG. 10 illustrates a computer screen display showing an electronic mail user interface for displaying mail items grouped according to mail type.

FIG. 10 illustrates a computer screen display showing an electronic mail user interface for displaying mail items grouped according to "Mail" arrangement type. As illustrated in FIG. 10, the "Arranged by" field identifies "Type" as the arrangement type selected by the user. If the user does not specify that electronic mail items are to be shown in groups, her electronic mail may be sorted by message type and may be displayed in alphabetical order of electronic mail type. According to the example user interface illustrated in FIG. 10, the user has selected to show the sorted electronic mail in groups. Accordingly, a first electronic mail type heading 1010 is displayed above electronic mail items 1025 of the type specified by the heading type 1010. For example, the example heading 1010 identifies an electronic mail type of "Meeting Requests." Accordingly, the electronic mail messages 1025 displayed underneath the heading 1010 include electronic mail messages involving meeting requests to the user. A second heading 1020 is illustrated for grouping messages having associated attachments. Thus, electronic mail items 1030 displayed underneath the heading 1020 include electronic mail messages having attachments. For purposes of illustration, an attachment icon 1035 is illustrated next to the mail items 1030 to show an associated attachment.

Figure 11:
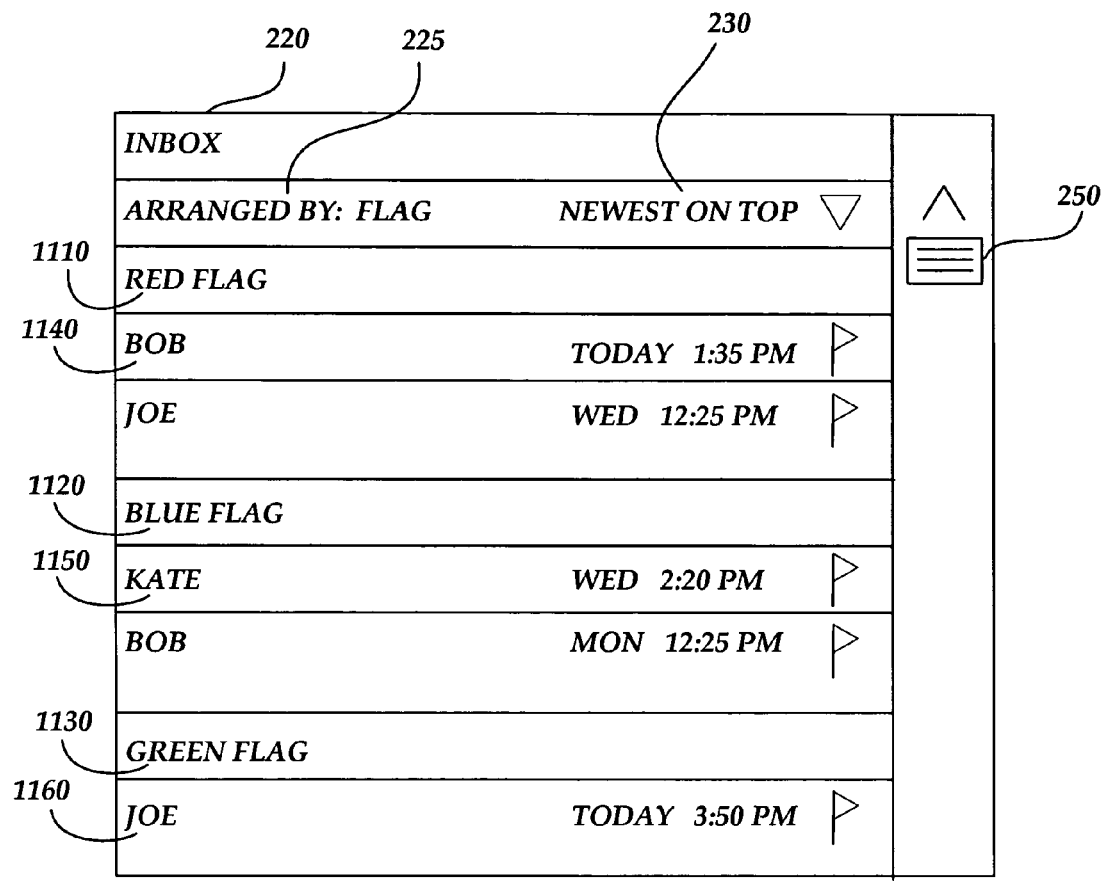
FIG. 11 illustrates a computer screen display showing an electronic mail user interface for displaying mail items grouped according to electronic mail flag type.

FIG. 11 illustrates a computer screen display showing an electronic mail user interface for displaying mail items grouped according to electronic mail flag type. According to the user interface 220 illustrated in FIG. 11, the user has selected the "Flag" arrangement type for sorting and grouping the user's electronic mail items. As should be appreciated by those skilled in the art, flags 1115, 1125, 1135 may be inserted for electronic mail messages for providing additional information to a recipient of a given electronic mail message. For example, a flag attached to or associated with an electronic message may indicate that the recipient should call the sender. A flag may indicate that the recipient should not forward a given electronic message. A flag may indicate that the recipient should follow up on a given electronic mail message. Flags associated with electronic mail messages may indicate other information including that a given electronic mail message is for the recipient's information, that the message should be forwarded, that no response to the electronic mail message is necessary, that the message should be read, that the message should be reviewed, that the message is a reply to all message, and the like.

Referring to FIG. 11, electronic mail messages sorted and grouped according to "Flag" type are illustrated. For purposes of example, a first heading 1110 is labeled "Red Flag." According to an embodiment of the present invention, colored flags may be utilized to indicate certain information. For example, a red flag 1115 associated with an electronic mail message may indicate that messages of this type should not be forwarded. As should be appreciated, the heading 1110 could also read "Do Not Forward," or the like, as a heading for electronic mail items 1140 having associated flags 1115 of this type. As should be appreciated, the particular language used for the heading 1110 may be varied according to the preferences of a developer of the electronic mail system. A second heading 1120 illustrated as "Blue Flag" may be displayed over electronic mail items 1150 bearing flag 1125 of the type associated with the blue flag heading 1120. As described above, blue flags attached to electronic mail messages may indicate certain information, for example "For Your Information," associated with an electronic mail item to which the flag 1125 is attached or associated. Thus, a user of the functionality of embodiments of the present invention may sort and group electronic mail items based on flags associated with electronic mail items. The user may then quickly and efficiently locate particular electronic mail items of a given flag type without the need for scrolling through every electronic mail item received by the user having an associated information flag.

Figure 12:
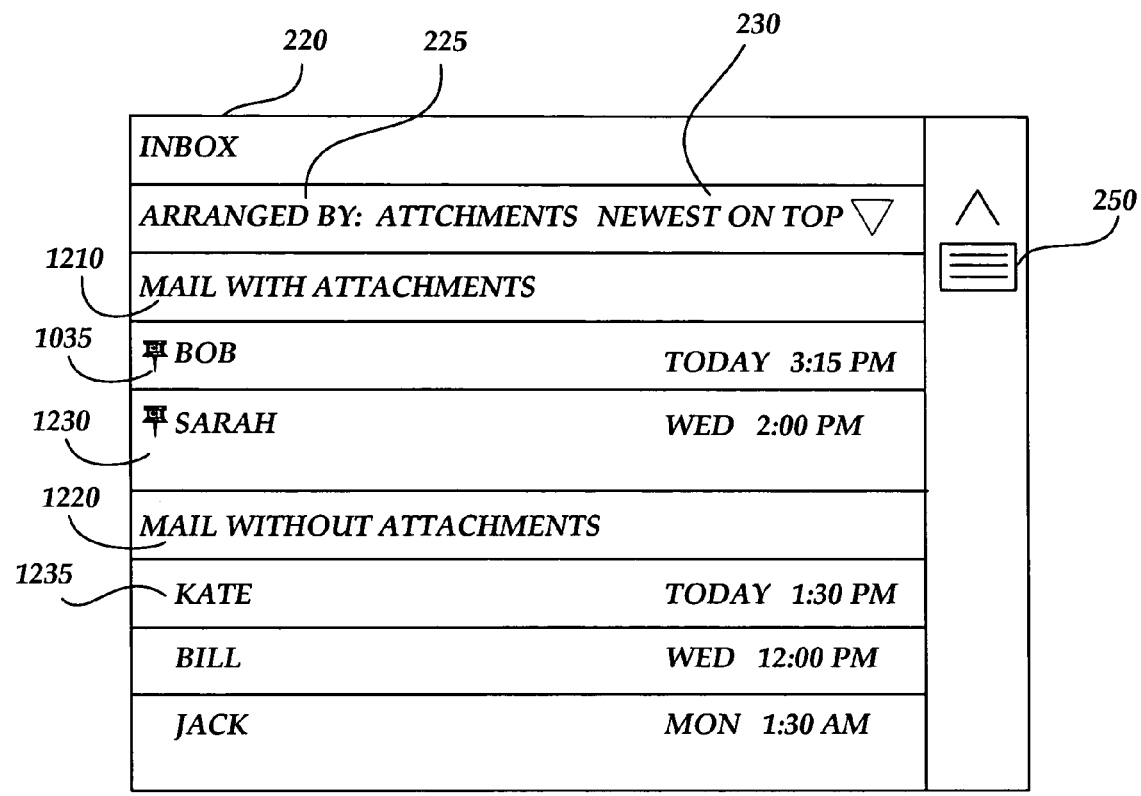
FIG. 12 illustrates a computer screen display showing an electronic mail user interface for displaying mail items grouped according to whether or not mail items include attachments.

FIG. 12 illustrates a computer screen display showing an electronic mail user interface for displaying mail items grouped according to whether or not mail items include attachments. According to the example user interface or pane 220 illustrated in FIG. 12, a user has selected an "Attachments" arrangement for sorting and grouping her electronic mail items. As illustrated in FIG. 12, the "Arranged by" field 225 identifies the "Attachments" arrangement type for sorting and grouping the user's electronic mail. Because the user has also selected that her electronic mail should be shown in groups, her electronic mail items are sorted and grouped according to whether each mail item is associated with an attachment or whether mail items are not associated with attachments. For example, a first heading 1210 bearing an example heading of "Mail With Attachments" is displayed above electronic mail items 1230 that include attached documents or files. As illustrated in FIG. 12, an attachment icon 1035 is shown for indicating that an attached file or document is associated with the mail items 1230. A second heading 1220 is displayed above mail items 1235 that do not include attached documents or files. The heading 1220 includes example language "Mail Without Attachments." Thus, if a user desires to locate a document the user recalls as having an attachment needed by the user, the user can utilize the "Attachments" arrangement type for quickly grouping together electronic mail items with attachments so that the user may quickly peruse only those electronic mail items having attachments without the need for scrolling through all electronic mail items received by the user.

Figure 13:
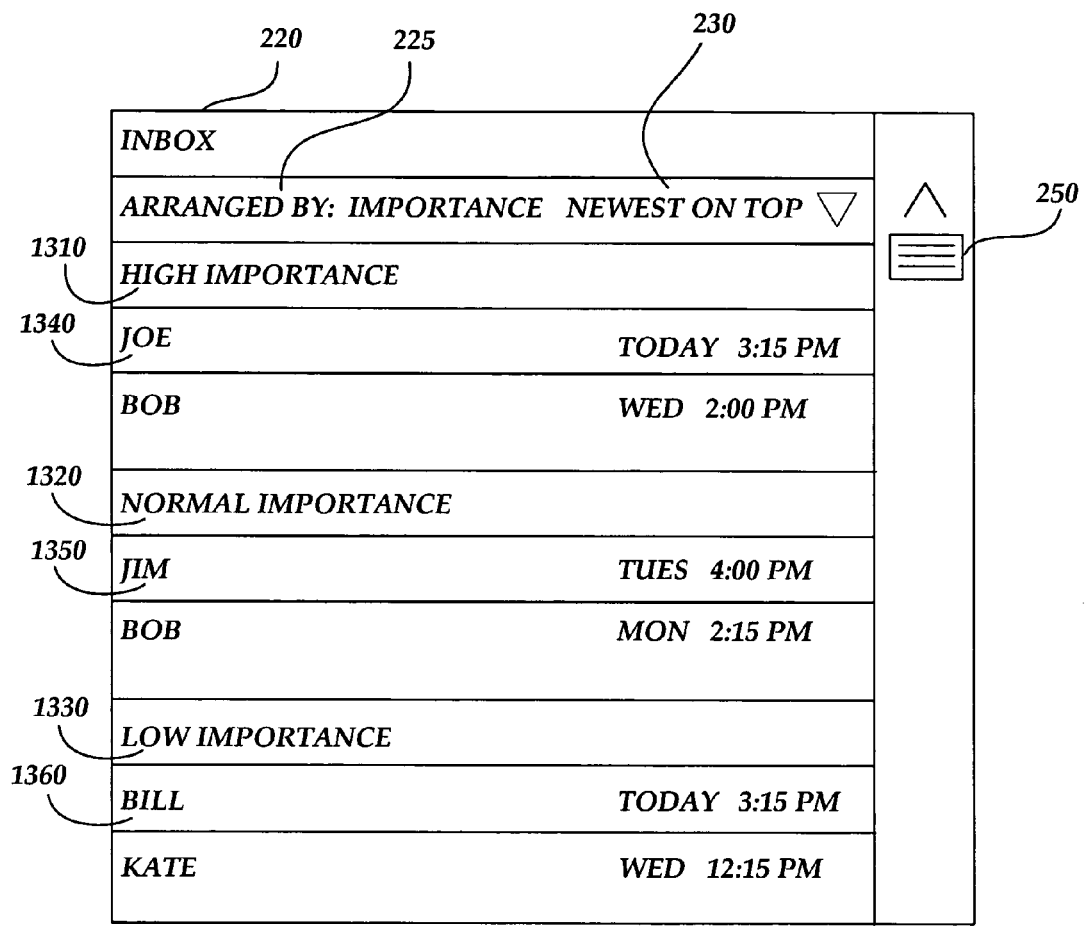
FIG. 13 illustrates a computer screen display showing an electronic mail user interface for displaying mail items grouped according to importance level.

FIG. 13 illustrates a computer screen display showing an electronic mail user interface for displaying mail items grouped according to importance level. According to the example user interface 220 illustrated in FIG. 13, a user has selected an "Importance" arrangement type whereby electronic mail items will be sorted and grouped according to an importance level associated with individual electronic mail items. As illustrated in FIG. 13, the "Arranged by" field identifies "Importance" as the selected arrangement type. As should be appreciated by those skilled in the art, electronic mail senders may attach an importance level to electronic mail messages to alert an electronic mail recipient of the importance level associated with a given electronic mail message. For example, an electronic mail sender may specify that a message is of "High" importance. Similarly, an electronic mail sender may specify that a given electronic mail message is of "Normal" importance or "Low" importance. According to some electronic mail systems, an electronic mail sender need not specify that a given electronic mail message is of "Normal" importance. Electronic mail messages may be considered of "Normal" importance by default unless specified as "High" or "Low" importance.

As illustrated in FIG. 13, electronic mail messages received by the user are illustrated as sorted and grouped according to importance level. A first grouping heading 1310 is illustrated for high importance messages and is displayed above electronic mail items 1340 that have been specified as "High" importance by their respective mail senders. A second heading 1320 for messages of "Normal" importance is displayed above electronic mail items 1350 whose importance level has been specified as "Normal" by their respective senders, or where no importance level has been specified. A third heading 1330 is displayed for messages specified as "Low" importance and is displayed over electronic mail items 1360 specified by their respective mail senders as being of "Low" importance. Thus, a user may quickly segregate messages by importance level for purposes of locating and reviewing a desired message where the user recalls that the message had a particular associated importance level.

Figure 14:
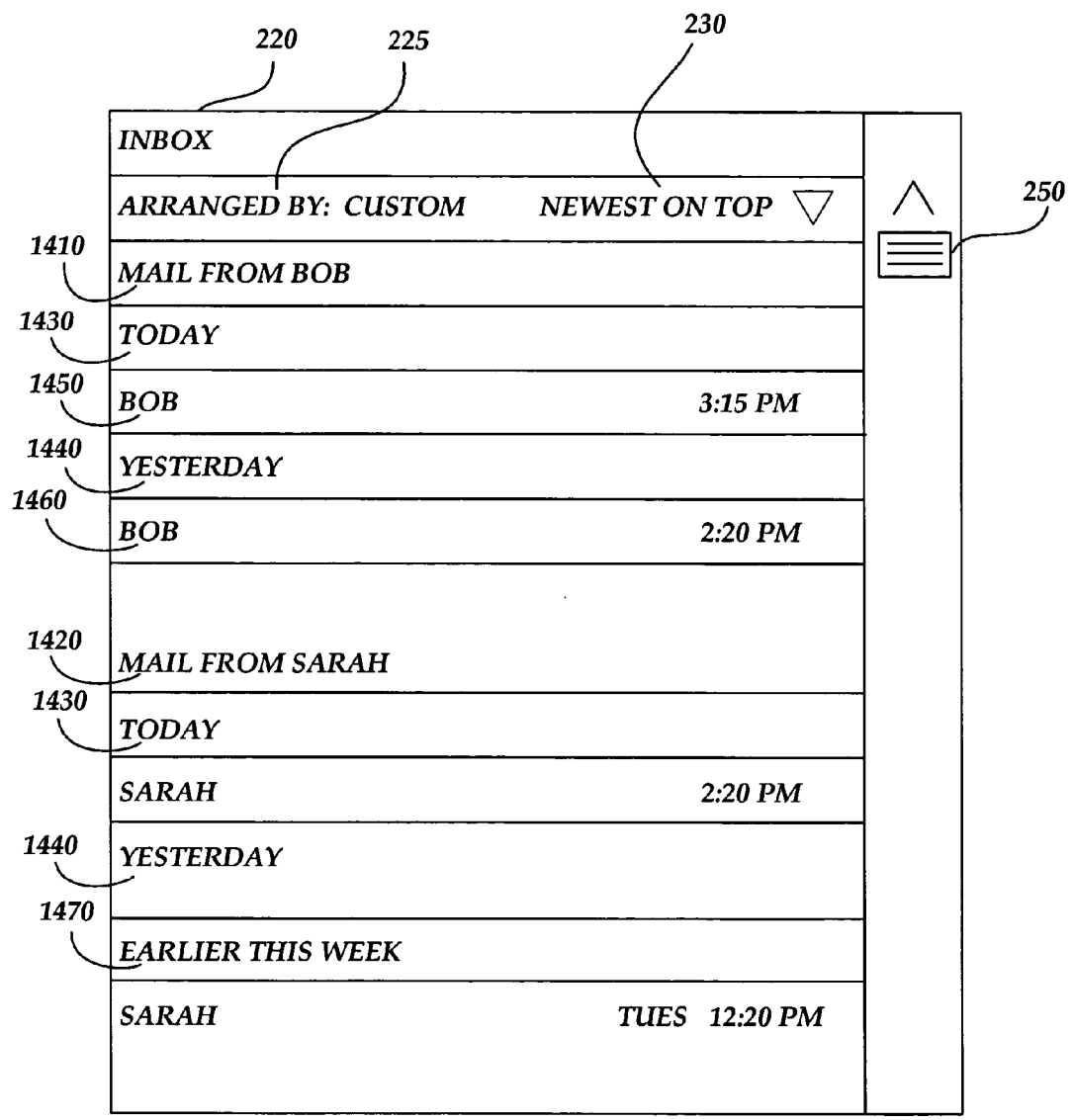
FIG. 14 illustrates a computer screen display showing an electronic mail user interface for displaying mail items grouped according to a customized automatic grouping specified by a user.

FIG. 14 illustrates a computer screen display showing an electronic mail user interface for displaying mail items grouped according to a customized automatic grouping specified by a user. As described above, according to embodiments of the present invention, a user may customize the automatic mail groupings applied to electronic mail messages received by, sent by, or stored by the user. The user may create custom automatic grouping arrangements in the form of combinations of other types of automatic grouping arrangements. For example, the user may create a customized automatic grouping arrangement whereby electronic mail is sorted and grouped based on the parties to which electronic mail items are sent combined with a sorting and grouping arrangement of electronic mail messages based on the date the messages are sent. Similarly, a user may create a customized automatic grouping arrangement whereby electronic mail items are sorted or grouped based on the date of receipt followed by a sorting and grouping of messages based on the importance level associated with particular mail items.

Referring to FIG. 14, the example user interface 220 illustrates a custom automatic grouping arrangement whereby the user has selected that electronic mail items should be sorted and grouped based on the parties from which electronic mail items have been received followed by a sorting and grouping of those electronic mail items based on the date of receipt. For example, a first group heading 1410 illustrates a heading "Mail from Bob" for grouping electronic mail items received from a particular mail sender. Underneath the heading 1410, a sub-heading 1430 of "Today" is displayed over electronic mail items received today from the particular mail sender "Bob." A second sub-heading 1440 is displayed under the primary heading 1410 bearing the heading title "Yesterday" and is displayed over a mail item 1460 received yesterday from the same electronic mail sender "Bob." Thus, by customizing the arrangement type applied to the user's electronic mail items, the user may group electronic mail messages received from particular senders in date groupings, so that the user may quickly locate particular mail items from particular mail senders received during particular timing periods. As should be appreciated by those skilled in the art, the customized arrangement type illustrated in FIG. 14 is for purposes of example only and is not limiting of the numerous combinations of arrangement types that may be applied to electronic mail items through creation of customized arrangement types.

Selection of the "Conversation" arrangement type, illustrated in FIG. 3, causes a grouping of electronic mail items associated with an electronic conversation string between two or more electronic users. An example user interface for illustration of the "Conversation" arrangement type is not described herein. For a detailed description regarding the "Conversation" automatic grouping arrangement type, see United States Patent Application, Applicant Reference No. 301753.01, 10/851442, which is incorporated herein by reference as if fully set out herein.

Figure 15:
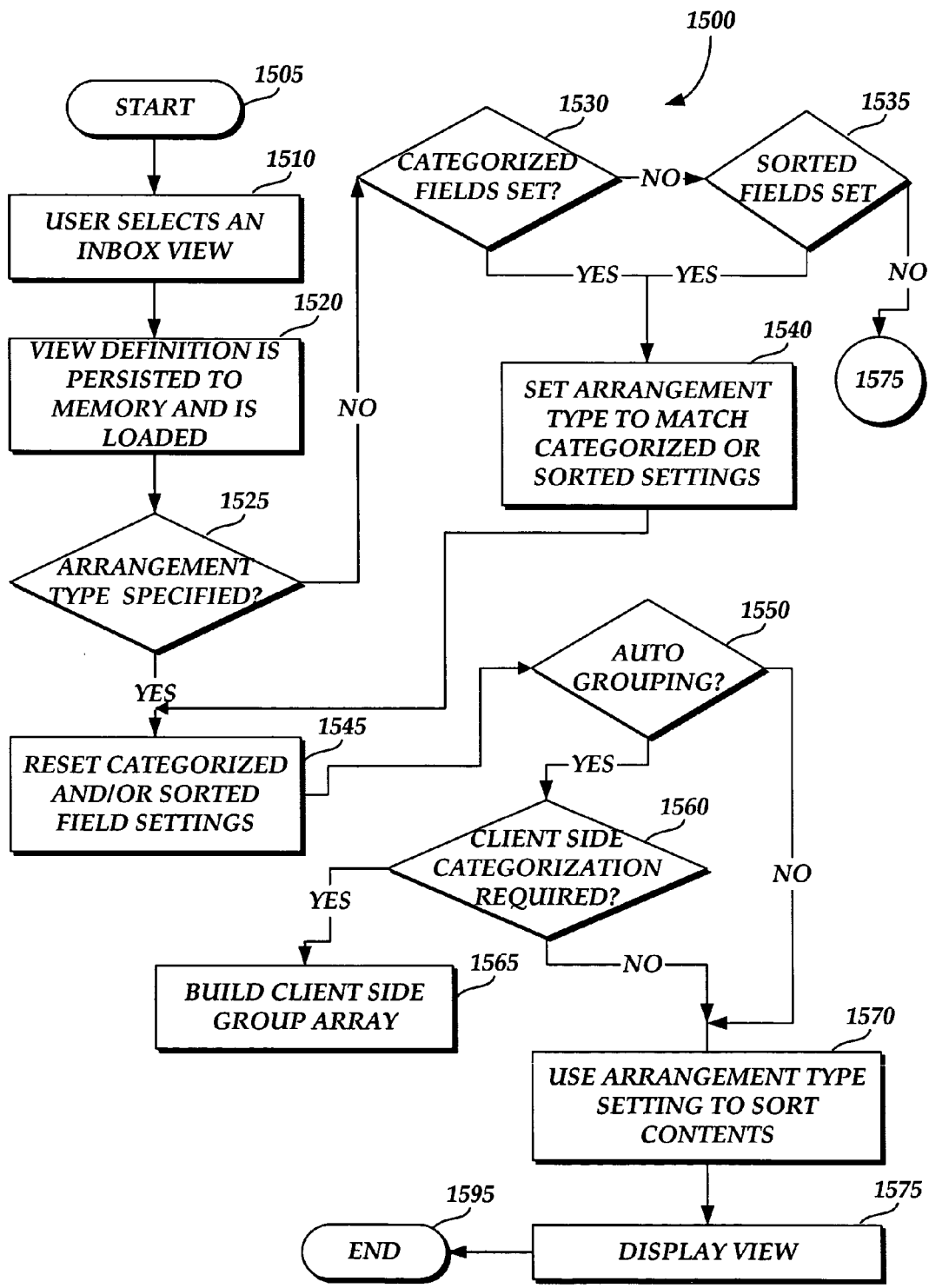
FIG. 15 is a flow diagram illustrating an illustrative routine for processing and persisting data associated with selected automatic mail groupings according to embodiments of the present invention.

As briefly described above, processing of the automatic mail grouping functionality described herein and persistence of data associated with resulting automatic grouping of electronic mail messages or items may typically be performed at an electronic mail server and may be accessible by one or more client side electronic mail software applications. According to embodiments of the present invention, some or all of the automatic mail grouping functionality may be performed at a client side electronic mail software application, or alternatively, some aspects of the automatic electronic mail grouping functionality may be performed by a client side electronic mail software application, while other aspects of the functionality may be processed at a server side electronic mail software system. FIG. 15 is a flow diagram illustrating an illustrative routine for processing and persisting data associated with selected automatic mail groupings according to embodiments of the present invention.

The routine 1500 begins at start block 1505 and proceeds to block 1510 where a user selects an "Inbox" view. For example, the user may select that an inbox user interface 220 be presented by the user's electronic mail system for reviewing received electronic mail. Alternatively, the user may select a "Sent Items" view, or one or more folder contents views. At block 1520, the view definition selected by the user is persisted to memory at a server side electronic mail system. For example, if the user has selected an "Inbox" view for reviewing the user's received electronic mail items, a view definition utilized by the electronic mail system for preparing the selected view is persisted into memory and is loaded by the server side electronic mail system.

At decision block 1525, a determination is made as to whether an automatic grouping arrangement type has been specified by the user, as described above with reference to FIGS. 3 through 14. If an arrangement type has not been specified by the user, the routine proceeds to decision block 1530, and a determination is made as to whether any grouping or category fields have been set for the user's electronic mail items. For example, the user's electronic mail system may be set to default to group electronic mail messages according to date. If no grouping or category fields are set for the electronic mail items, the routine proceeds to block 1535, and a determination is made as to whether any sorting fields are set for the electronic mail items. That is, a determination is made as to whether any default sorting settings are specified for the user's electronic mail. For example, a default sorting setting specifying that the electronic mail should be sorted based on date received may be set for the user's electronic mail messages. If no sorting properties are set for the user's electronic mail messages, the routine proceeds to block 1575, and the client side electronic mail software application is caused to display the user's electronic mail messages according to the persisted view definition without regard to any particular mail grouping categories or sorting properties.

Returning back to decision blocks 1530 and 1535, if mail groupings or categories have been set, or if sorting properties have been set for the user's electronic mail items, the routine proceeds to block 1540, and an automatic mail grouping arrangement type (as described above with reference to FIGS. 3 through 14) is set to match the mail grouping categories or sorting properties set for the user's electronic mail items. The routine then proceeds to block 1545. At block 1545, any previously set mail grouping arrangement types or mail sorting properties are reset to the values determined at block 1540, or specified by the user at block 1525. At block 1550, a determination is made as to whether automatic grouping functionality is activated for the user's electronic mail messages. If not, the routine proceeds to block 1570, and the arrangement type set for the user's electronic mail messages at block 1545 is utilized for sorting and grouping the user's electronic mail messages. The routine then proceeds to block 1575, as described above.

Referring back to block 1550, if the automatic grouping functionality of the present invention is selected, the routine proceeds to decision block 1560, and a determination is made as to whether client side processing is required. According to embodiments of the present invention, categorization and grouping of electronic mail messages according to date and/or size is processed and associated data is persisted by the client side electronic mail software application. For example, if the user has selected that electronic mail messages are to be sorted and grouped according to "Date" or "Size" arrangement types, as described above, the routine proceeds to block 1565, and a client side grouping array is built by the client side electronic mail software application for placing electronic mail messages into appropriate "Date" or "Size" mail groupings, as described above with reference to FIGS. 2, 4 and 8.

If no client side processing is required at decision block 1560, or after a client side mail grouping array is built at block 1565, the routine proceeds to block 1570. At block 1570, the arrangement type setting specified for the user's electronic mail messages is utilized by the server side electronic mail system for preparing an electronic mail view for display by the client side electronic mail software application. That is, the selected view definition is passed from the server side electronic mail system along with persisted data required by the client side software application for displaying the specified view (e.g., "Inbox" view) along with electronic mail messages sorted and grouped according to the automatic grouping properties applied to the electronic mail messages. When the client side software application receives the view definition and persisted data from the server side electronic mail system, any client side electronic mail grouping definition and/or data constructed by the client side electronic mail system, as described above with reference to blocks 1560 and 1565, is utilized by the client side application for preparing any portion of the displayed view associated with the client side mail grouping data. At block 1575, the constructed electronic mail view is displayed by the client side electronic mail application. The routine ends at block 1595.

As described herein, methods and systems are provided for automatically sorting and grouping electronic mail messages in an electronic mail system. It will be apparent to those skilled in the art that various modifications or variations may be made in the present invention without departing from the scope or spirit of the invention. Other embodiments of the present invention will be apparent to those skilled in the art from consideration of the specification and practice of the invention disclosed herein.

We claim:

1. A method of automatically sorting and grouping electronic mail items, comprising:
   receiving a plurality of electronic mail items;
   selecting a drop down menu;
   in response to selecting the drop down menu, displaying the drop down menu wherein the drop down menu contains at least one of a plurality of electronic mail grouping arrangement types;
   making at least one selection from the drop down menu;
   in response to a first selection from the drop down menu, applying an electronic mail grouping arrangement type to the plurality of electronic mail items;
   in response to a second selection from the drop down menu, applying the electronic mail grouping arrangement type to the plurality of electronic mail items and automatically grouping the plurality of electronic mail items grouped according to the electronic mail grouping arrangement type into at least one sub-group;
   preparing at least one electronic mail grouping according to the electronic mail grouping arrangement type applied to the plurality of electronic mail items; and
   populating each of the at least one electronic mail grouping with corresponding electronic mail items from the plurality of electronic mail items.

2. The method of claim 1, further comprising:
   displaying the plurality of electronic mail items in an electronic mail user interface where electronic mail items corresponding to a first electronic mail category are displayed together as a first electronic mail grouping, and where electronic mail items corresponding to a second electronic mail category are displayed together as a second electronic mail grouping.

3. The method of claim 2, further comprising:
   displaying a first heading above the first electronic mail grouping for identifying electronic mail items displayed together as the first electronic mail category.

4. The method of claim 3, further comprising:
   displaying a second heading above the second electronic mail grouping for identifying electronic mail items displayed together as the second electronic mail category.

5. The method of claim 4, prior to applying an electronic mail grouping arrangement type to the plurality of electronic mail items, further comprising:
   applying an electronic mail sorting type to the plurality of electronic mail items.

6. The method of claim 5, further comprising:
   sorting the plurality of electronic mail items according to the electronic mail sorting type such that electronic mail items displayed together as the first electronic mail grouping and electronic mail items displayed together as the second electronic mail grouping are sorted according to the applied electronic mail sorting type.

7. The method of claim 2,
   wherein displaying the plurality of electronic mail items in an electronic mail user interface includes displaying together as the first electronic mail grouping at least one electronic mail item associated with a first parameter of the electronic mail grouping arrangement type; and
   wherein displaying the plurality of electronic mail items in an electronic mail user interface includes displaying together as the second electronic mail grouping at least one electronic mail item associated with a second parameter of the electronic mail grouping arrangement type.

8. The method of claim 2,
   wherein applying an electronic mail grouping arrangement type to the plurality of electronic mail items includes applying a "Date" arrangement type to the plurality of electronic mail items; and
   wherein displaying the plurality of electronic mail items in an electronic mail user interface includes displaying together as the first electronic mail grouping at least one electronic mail item associated with a first "Date" arrangement type category wherein the at least one electronic mail item associated with the first "Date" arrangement type category are received within a first date parameter; and
   wherein displaying the plurality of electronic mail items in an electronic mail user interface includes displaying together as the second electronic mail grouping at least one electronic mail item associated with a second "Date" arrangement type category wherein the at least one electronic mail item associated with the second "Date" arrangement type category are received within a second date parameter.

9. The method of claim 2,
wherein applying an electronic mail grouping arrangement type to the plurality of electronic mail items includes applying a "From" arrangement type to the plurality of electronic mail items; and
wherein displaying the plurality of electronic mail items in an electronic mail user interface includes displaying together as the first electronic mail grouping at least one electronic mail item associated with a first "From" arrangement type category wherein the at least one electronic mail item associated with the first "From" arrangement type category are received from a first mail sender; and
wherein displaying the plurality of electronic mail items in an electronic mail user interface includes displaying together as the second electronic mail grouping at least one electronic mail item associated with a second "From" arrangement type category wherein the at least one electronic mail item associated with the second "From" arrangement type category are received from a second mail sender.

10. The method of claim 2,
wherein applying an electronic mail grouping arrangement type to the plurality of electronic mail items includes applying a "To" arrangement type to the plurality of electronic mail items; and
wherein displaying the plurality of electronic mail items in an electronic mail user interface includes displaying together as the first electronic mail grouping at least one electronic mail item associated with a first "To" arrangement type category wherein the at least one electronic mail item associated with the first "To" arrangement type category are sent to a first mail sender; and
wherein displaying the plurality of electronic mail items in an electronic mail user interface includes displaying together as the second electronic mail grouping at least one electronic mail item associated with a second "To" arrangement type category wherein the at least one electronic mail item associated with the second "To" arrangement type category are sent to a second mail sender.

11. The method of claim 2,
wherein applying an electronic mail grouping arrangement type to the plurality of electronic mail items includes applying a "Size" arrangement type to the plurality of electronic mail items; and
wherein displaying the plurality of electronic mail items in an electronic mail user interface includes displaying together as the first electronic mail grouping at least one electronic mail item associated with a first "Size" arrangement type category wherein the at least one electronic mail item associated with the first "Size" arrangement type category are of a size falling within a first size parameter; and
wherein displaying the plurality of electronic mail items in an electronic mail user interface includes displaying together as the second electronic mail grouping at least one electronic mail item associated with a second "Size" arrangement type category wherein the at least one electronic mail item associated with the second "Size" arrangement type category are of a size falling within a second size parameter.

12. The method of claim 2,
wherein applying an electronic mail grouping arrangement type to the plurality of electronic mail items includes applying a "Subject" arrangement type to the plurality of electronic mail items; and
wherein displaying the plurality of electronic mail items in an electronic mail user interface includes displaying together as the first electronic mail grouping at least one electronic mail item associated with a first "Subject" arrangement type category wherein the at least one electronic mail item associated with the first "Subject" arrangement type category have a mail subject matching a first subject parameter; and
wherein displaying the plurality of electronic mail items in an electronic mail user interface includes displaying together as the second electronic mail grouping at least one electronic mail item associated with a second "Subject" arrangement type category wherein the at least one electronic mail item associated with the second "Subject" arrangement type category have a mail subject matching a second subject parameter.

13. The method of claim 2,
wherein applying an electronic mail grouping arrangement type to the plurality of electronic mail items includes applying a "Type" arrangement type to the plurality of electronic mail items; and
wherein displaying the plurality of electronic mail items in an electronic mail user interface includes displaying together as the first electronic mail grouping at least one electronic mail item associated with a first "Type" arrangement type category wherein the at least one electronic mail item associated with the first "Type" arrangement type category have a mail type matching a first electronic mail type; and
wherein displaying the plurality of electronic mail items in an electronic mail user interface includes displaying together as the second electronic mail grouping at least one electronic mail item associated with a second "Type" arrangement type category wherein the at least one electronic mail item associated with the second "Type" arrangement type category have a mail type matching a second electronic mail type.

14. The method of claim 2,
wherein applying an electronic mail grouping arrangement type to the plurality of electronic mail items includes applying a "Flag" arrangement type to the plurality of electronic mail items; and
wherein displaying the plurality of electronic mail items in an electronic mail user interface includes displaying together as the first electronic mail grouping at least one electronic mail item associated with a first "Flag" arrangement type category wherein the at least one electronic mail item associated with the first "Flag" arrangement type category are flagged with a first mail flag type; and
wherein displaying the plurality of electronic mail items in an electronic mail user interface includes displaying together as the second electronic mail grouping at least one electronic mail item associated with a second "Flag" arrangement type category wherein the at least one electronic mail item associated with the second "Flag" arrangement type category are flagged with a second mail flag type.

15. The method of claim 2,
wherein applying an electronic mail grouping arrangement type to the plurality of electronic mail items includes applying a "Attachments" arrangement type to the plurality of electronic mail items; and wherein displaying the plurality of electronic mail items in an electronic mail user interface includes displaying together as the first electronic mail grouping at least one electronic mail item associated with a first "Attachments" arrangement type category wherein the at least one electronic mail item associated with the first "Attachments" arrangement type category each contain attachments; and wherein displaying the plurality of electronic mail items in an electronic mail user interface includes displaying together as the second electronic mail grouping at least one electronic mail item associated with a second "Attachments" arrangement type category where the at least one electronic mail item associated with the second "Attachments" arrangement type category each do not contain attachments.

16. The method of claim 2, wherein applying an electronic mail grouping arrangement type to the plurality of electronic mail items includes applying a "Importance" arrangement type to the plurality of electronic mail items; and wherein displaying the plurality of electronic mail items in an electronic mail user interface includes displaying together as the first electronic mail grouping at least one electronic mail item associated with a first "Importance" arrangement type category wherein the at least one electronic mail item associated with the first "Importance" arrangement type category have an associated importance level matching a first importance level; and wherein displaying the plurality of electronic mail items in an electronic mail user interface includes displaying together as the second electronic mail grouping at least one electronic mail item associated with a second "Importance" arrangement type category wherein the at least one electronic mail item associated with the second "Importance" arrangement type category have an associated importance level matching a second importance level.

17. The method of claim 2, wherein applying an electronic mail grouping arrangement type to the plurality of electronic mail items includes applying a "Folder" arrangement type to the plurality of electronic mail items; and wherein displaying the plurality of electronic mail items in an electronic mail user interface includes displaying together as the first electronic mail grouping at least one electronic mail item associated with a first "Folder" arrangement type category wherein the at least one electronic mail item associated with the first "Folder" arrangement type category are contained in a first mail folder; and wherein displaying the plurality of electronic mail items in an electronic mail user interface includes displaying together as the second electronic mail grouping at least one electronic mail item associated with a second "Folder" arrangement type category wherein the at least one electronic mail item associated with the second "Folder" arrangement type category are contained in a second mail folder.

18. The method of claim 1, whereby applying an electronic mail grouping arrangement type to the plurality of electronic mail items includes applying a custom electronic mail grouping arrangement type comprised of a combination of at least two electronic mail grouping types to the plurality of electronic mail items.

19. The method of claim 18, whereby preparing at least one electronic mail grouping according to the electronic mail grouping arrangement type applied to the plurality of electronic mail items includes preparing at least one sub-grouping for each of the at least one electronic mail grouping, wherein the at least one electronic mail grouping is associated with a first electronic mail grouping type of the at least two electronic mail grouping types and wherein the at least one sub-grouping for each of the at least one electronic mail grouping is associated with a second electronic mail grouping type of the at least two electronic mail grouping types.

20. A method of automatically sorting and grouping electronic mail messages, comprising:

receiving a plurality of electronic mail messages;

selecting a drop down menu;

in response to selecting the drop down menu, displaying the drop down menu wherein the drop down menu contains at least one of a plurality of electronic mail grouping arrangement types;

making at least one selection from the drop down menu;

in response to a first selection from the drop down menu, applying an electronic mail grouping arrangement type to the plurality of electronic mail items;

in response to a second selection from the drop down menu, applying the electronic mail grouping arrangement type to the plurality of electronic mail items and automatically grouping the plurality of electronic mail items grouped according to the electronic mail grouping arrangement type into at least one sub-group;

preparing one electronic mail groupings according to the electronic mail grouping arrangement type applied to the plurality of electronic mail messages;

populating each of the one electronic mail groupings with corresponding electronic mail items from the plurality of electronic mail messages;

displaying the plurality of electronic mail items in an electronic mail user interface where electronic mail messages corresponding to a first electronic mail category are displayed together as a first electronic mail grouping, and where electronic mail messages corresponding to a second electronic mail category are displayed together as a second electronic mail grouping; and displaying a heading above each of the first and second electronic mail groupings for identifying electronic mail items displayed together as the first and second electronic mail categories.

21. The method of claim 20, wherein displaying the plurality of electronic mail messages in an electronic mail user interface includes displaying together as the first electronic mail grouping at least one electronic mail message associated with a first parameter of the electronic mail grouping arrangement type; and wherein displaying the plurality of electronic mail messages in an electronic mail user interface includes displaying together as the second electronic mail grouping at least one electronic mail message associated with a second parameter of the electronic mail grouping arrangement type.

22. A computer-readable storage medium on which is stored computer-executable instructions which when executed by a computer perform a method of automatically sorting and grouping electronic mail items, comprising:

receiving a plurality of electronic mail items;

selecting a drop down menu;

in response to selecting the drop down menu, displaying the drop down menu wherein the drop down menu contains at least one of a plurality of electronic mail grouping arrangement types;

making at least one selection from the drop down menu;

in response to a first selection from the drop down menu, applying an electronic mail grouping arrangement type to the plurality of electronic mail items;

in response to a second selection from the drop down menu, applying the electronic mail grouping arrangement type to the plurality of electronic mail items and automatically grouping the plurality of electronic mail items grouped according to the electronic mail grouping arrangement type into at least one sub-group;

preparing at least one electronic mail grouping according to the electronic mail grouping arrangement type applied to the plurality of electronic mail items;

and populating each of the at least one electronic mail grouping with corresponding electronic mail items from the plurality of electronic mail items.

23. The computer-readable storage medium of claim 22, further comprising:

displaying the plurality of electronic mail items in an electronic mail user interface where electronic mail items corresponding to a first electronic mail category are displayed together as a first electronic mail grouping, and where electronic mail items corresponding to a second electronic mail category are displayed together as a second electronic mail grouping.

24. The computer-readable storage medium of claim 23, further comprising:

displaying a first heading above the first electronic mail grouping for identifying electronic mail items displayed together as the first electronic mail category.

25. The computer-readable storage medium of claim 24, further comprising:

displaying a second heading above the second electronic mail grouping for identifying electronic mail items displayed together as the second electronic mail category.

26. The computer-readable storage medium of claim 23, wherein displaying the plurality of electronic mail items in an electronic mail user interface includes displaying together as the first electronic mail grouping at least one electronic mail item associated with a first parameter of the electronic mail grouping arrangement type; and wherein displaying the plurality of electronic mail items in an electronic mail user interface includes displaying together as the second electronic mail grouping at least one electronic mail item associated with a second parameter of the electronic mail grouping arrangement type.

* * * * *